US012659678B2

(12) United States Patent
Yang et al.

(10) Patent No.: US 12,659,678 B2
(45) **Date of Patent: *Jun. 16, 2026**

(54) HEARING DEVICE INCORPORATING CONFORMAL FOLDED ANTENNA

(71) Applicant: Starkey Laboratories, Inc., Eden Prairie, MN (US)

(72) Inventors: Zhenchao Yang, Eden Prairie, MN (US); Deepak Hosadurga, Bloomington, MN (US); Karl Hilde, St. Paul, MN (US); Beau Jay Polinske, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 7 days.

This patent is subject to a terminal disclaimer.

(21) Appl. No.: 18/783,717

(22) Filed: Jul. 25, 2024

(65) Prior Publication Data

US 2025/0063314 A1 Feb. 20, 2025

Related U.S. Application Data

(63) Continuation of application No. 18/214,822, filed on Jun. 27, 2023, now Pat. No. 12,081,947, which is a (Continued)

(51) Int. Cl.
*H01Q 1/22* (2006.01)
*H01Q 1/27* (2006.01)
(Continued)

(52) U.S. Cl.
CPC ......... *H04R 25/609* (2019.05); *H01Q 1/2291* (2013.01); *H01Q 1/273* (2013.01); (Continued)

(58) Field of Classification Search
CPC .... H04R 25/609; H04R 25/554; H04R 25/60; H04R 2225/51; H01Q 1/2291;
(Continued)

(56) References Cited

U.S. PATENT DOCUMENTS

| | | | |
|---|---|---|---|
| 6,720,923 | B1 | 4/2004 | Hayward |
| 7,097,945 | B2 | 8/2006 | Chang |

(Continued)

FOREIGN PATENT DOCUMENTS

| | | |
|---|---|---|
| DE | 102015208845 | 8/2016 |
| EP | 1465457 | 10/2004 |

(Continued)

OTHER PUBLICATIONS

Summons to Attend Oral Proceedings Pursuant to Rule 115(1) EPC from counterpart European Application No. 17201900.2 dated May 20, 2025, 10 pp.

(Continued)

*Primary Examiner* — Dameon E Levi
*Assistant Examiner* — Michael M Bouizza
(74) *Attorney, Agent, or Firm* — Shumaker & Sieffert, P.A.

(57) ABSTRACT

A hearing device adapted to be worn by a wearer comprises a shell configured for placement on an exterior surface of an ear of the wearer. The shell comprises a first end, a second end, a bottom, a top, and opposing sides, wherein the bottom, top, and opposing sides extend between the first and second ends. Circuitry is provided within the shell comprising at least a microphone, signal processing circuitry, radio circuitry, and a power source. A folded antenna is coupled to the radio circuitry and extends longitudinally along one of the bottom and the top and along the opposing sides between the first and second ends. The folded antenna encompasses at least some of the circuitry and forms an elongated gap (Continued)

between the opposing sides. The elongated gap faces the other of the bottom and the top.

13 Claims, 14 Drawing Sheets

Related U.S. Application Data continuation of application No. 17/137,809, filed on Dec. 30, 2020, now Pat. No. 11,729,561, which is a continuation of application No. 16/750,871, filed on Jan. 23, 2020, now Pat. No. 10,886,603, which is a continuation of application No. 16/249,421, filed on Jan. 16, 2019, now Pat. No. 10,581,144, which is a continuation of application No. 15/351,643, filed on Nov. 15, 2016, now Pat. No. 10,256,529.

(51) Int. Cl.

| | |
|---|---|
| ***H01Q 1/38*** | (2006.01) |
| ***H01Q 1/40*** | (2006.01) |
| ***H01Q 5/335*** | (2015.01) |
| ***H01Q 9/04*** | (2006.01) |
| ***H04R 25/00*** | (2006.01) |

(52) U.S. Cl.
CPC ................. *H01Q 1/38* (2013.01); *H01Q 1/40* (2013.01); *H01Q 5/335* (2015.01); *H01Q 9/0414* (2013.01); *H04R 25/554* (2013.01); *H04R 25/60* (2013.01); *H04R 2225/51* (2013.01)

(58) Field of Classification Search
CPC ............ H01Q 1/273; H01Q 1/38; H01Q 1/40; H01Q 5/335; H01Q 9/0414
See application file for complete search history.

(56) References Cited

U.S. PATENT DOCUMENTS

| | | | | |
|---|---|---|---|---|
| 7,598,921 | B2 | 10/2009 | Ge | |
| 7,646,356 | B2 | 1/2010 | Adel | |
| 8,188,926 | B2 | 5/2012 | Ganwani | |
| 8,565,457 | B2 | 10/2013 | Polinske | |
| 8,587,484 | B2 | 11/2013 | Peng | |
| 8,699,733 | B2 | 4/2014 | Polinske | |
| 9,179,227 | B2 | 11/2015 | Polinske | |
| 9,264,826 | B2 | 2/2016 | Helgeson | |
| 9,374,650 | B2 | 6/2016 | Bauman | |
| 9,402,141 | B2 | 7/2016 | Kvist | |
| 9,408,004 | B2 | 8/2016 | Higgins | |
| 9,543,655 | B2 | 1/2017 | Hoon | |
| 9,571,944 | B2 | 2/2017 | Fischer | |
| 9,641,944 | B2 | 5/2017 | Johnson | |
| 9,877,122 | B2 | 1/2018 | Flaig | |
| 10,256,529 | B2 * | 4/2019 | Yang .................... | H01Q 1/2291 |
| 10,297,910 | B2 | 5/2019 | Hosadurga | |
| 10,581,144 | B2 | 3/2020 | Yang et al. | |
| 10,886,603 | B2 | 1/2021 | Yang | |
| 11,729,561 | B2 * | 8/2023 | Yang .................... | H04R 25/554 343/718 |
| 12,081,947 | B2 * | 9/2024 | Yang .................... | H04R 25/554 |
| 2004/0196996 | A1 | 10/2004 | Feitel | |
| 2009/0231204 | A1 | 9/2009 | Shaker | |
| 2010/0158293 | A1 * | 6/2010 | Polinske .................. | H01Q 7/00 381/315 |
| 2011/0009925 | A1 | 1/2011 | Leigh | |
| 2013/0343586 | A1 | 12/2013 | Kvist | |
| 2014/0002316 | A1 | 1/2014 | Liu | |
| 2014/0010394 | A1 | 1/2014 | Kvist | |
| 2015/0042524 | A1 | 2/2015 | Kerselaers | |
| 2015/0071470 | A1 | 3/2015 | Link | |
| 2019/0006757 | A1 | 1/2019 | Nikles | |
| 2019/0098420 | A1 | 3/2019 | Elghannai | |
| 2019/0373381 | A1 | 12/2019 | Elghannai | |

FOREIGN PATENT DOCUMENTS

| | | |
|---|---|---|
| EP | 1531649 | 6/2008 |
| EP | 2680366 | 1/2014 |
| EP | 2723101 | 6/2014 |
| EP | 2765650 | 8/2014 |
| EP | 2680613 | 12/2014 |
| EP | 314821 | 3/2017 |
| EP | 3148219 | 3/2017 |

OTHER PUBLICATIONS

European Patent No. 3 322 202, filed Nov. 15, 2017; European Notice of Opposition, issued Jan. 20, 2023; 37 pages.

Response to Communication Pursuant to the grounds of appeal EPC dated Oct. 31, 2024, from counterpart European Application No. 17201900.2, filed Mar. 6, 2024, 46 pp.

Decision on Appeal from counterpart European Application No. 17201900.2 dated Aug. 21, 2025, 24 pp.

Extended Search Report from counterpart European Application No. 17201900.2 dated Mar. 14, 2018, 9 pp.

Minutes of the Oral Proceedings before the Examining Division from counterpart European Application No. 17201900.2 Jul. 9, 2024, 90 pp.

Notice of Intent to Grant and Text Intended to Grant from counterpart European Application No. 17201900.2 dated Oct. 27, 2021, 76 pp.

Response to Communication pursuant to Article 94(3) EPC dated Nov. 19, 2019, from counterpart European Application No. 17201900.2 filed May 28, 2020, 11 pp.

Response to Extended Search Report dated May 22, 2018, from counterpart European Application No. 17201900.2 filed Nov. 16, 2018, 17 pp.

Response to Summons to Attend Oral Proceedings pursuant to Rule 115(1) EPC dated Apr. 23, 2024, including Main Request, from European Patent Application No. 18/783,717] filed Apr. 29, 2024, 9 pp.

Response to Summons to Attend Oral Proceedings pursuant to Rule 115(1) EPC dated Dec. 4, 2023, including Main Request, from European Patent Application No. 17201900.2] filed Apr. 23, 2023, 80 pp.

Response to Summons to Attend Oral Proceedings pursuant to Rule 115(1) EPC dated Jan. 20, 2023, including Main Request, from European Patent Application No. 17201900.2] filed Jun. 9, 2023, 36 pp.

Response to Summons to Attend Oral Proceedings pursuant to Rule 115(1) EPC dated Mar. 25, 2021, including Main Request, from European Patent Application No. 17201900.2] filed Sep. 6, 2021, 140 pp.

Summons to Attend Oral Proceedings Pursuant to Rule 115(1) EPC from counterpart European Application No. 17201900.2 dated Mar. 25, 2021, 11 pp.

Summons to Attend Oral Proceedings Pursuant to Rule 115(1) EPC from counterpart European Application No. 18/783,717 dated Dec. 4, 2023, 17 pp.

Response to Appeal dated Jul. 16, 2024, from counterpart European Application No. 17201900.2, filed Oct. 31, 2024, 86 pp.

Decision on Appeal from counterpart European Application No. 17201900.2 dated Aug. 21, 2025, 17 pp.

Notice of Appeal from counterpart European Application No. 17201900.2, filed Jul. 16, 2024, 4 pp.

Notice of Opposition from counterpart European Application No. 17201900.2 dated Jan. 20, 2023, 132 pp.

Statement of grounds for Appeal from counterpart European Application No. 17201900.2, filed Oct. 31, 2024, 90 pp.

Response to Grounds of Appeal dated Oct. 31, 2024, from counterpart Application No. 17201900.2 filed Mar. 6, 2025, 47 pp.

* cited by examiner

Grain Pattern Parallel to Head

HEARING DEVICE INCORPORATING CONFORMAL FOLDED ANTENNA

RELATED PATENT DOCUMENTS

This application is a continuation of U.S. patent application Ser. No. 18/214,822, filed Jun. 27, 2023, which is a continuation of U.S. patent application Ser. No. 17/137,809, filed Dec. 30, 2020, now U.S. Pat. No. 11,729,561, which is a continuation of U.S. patent application Ser. No. 16/750,871, filed Jan. 23, 2020, now U.S. Pat. No. 10,886,603, which is a continuation of U.S. patent application Ser. No. 16/249,421, filed Jan. 16, 2019, now U.S. Pat. No. 10,581,144, which is a continuation of U.S. patent application Ser. No. 15/351,643, filed Nov. 15, 2016, now U.S. Pat. No. 10,256,529, which are incorporated herein by reference in their entireties.

TECHNICAL FIELD

This application relates generally to hearing devices, including hearing aids and other hearables.

BACKGROUND

Hearing instruments can incorporate a radio and an antenna to wirelessly communicate with other devices. For example, a hearing instrument may receive audio from a transceiver which is connected to a television or a radio. This audio may be reproduced by the speaker of the hearing instrument, hereby allowing the wearer to hear the audio source without having to disturb others by turning up the volume on the audio source. Hearing instruments positioned on left and right ears of a wearer can be configured to communicate using an ear-to-car link in addition to communicating with other devices.

SUMMARY

According to some embodiments, a hearing device adapted to be worn by a wearer comprises a shell configured for placement on an exterior surface of an ear of the wearer. The shell comprises a first end, a second end, a bottom, a top, and opposing sides, wherein the bottom, top, and opposing sides extend between the first and second ends. Circuitry is provided within the shell comprising at least a microphone, signal processing circuitry, radio circuitry, and a power source. A folded antenna is coupled to the radio circuitry and extends longitudinally along one of the bottom and the top and along the opposing sides between the first and second ends. The folded antenna encompasses at least some of the circuitry and forms an elongated gap between the opposing sides. The elongated gap faces the other of the bottom and the top.

According to other embodiments, a hearing device adapted to be worn by a wearer comprises a shell configured for placement on an exterior surface of an ear of the wearer. The shell comprises a first end, a second end, a bottom, a top, and opposing sides, wherein the bottom, top, and opposing sides extend between the first and second ends. Circuitry is provided within the shell comprising at least a microphone, signal processing circuitry, radio circuitry, and a power source. A folded antenna is coupled to the radio circuitry and extends longitudinally along one of the bottom and the top and along the opposing sides between the first and second ends. The folded antenna encompasses at least some of the circuitry and forms an elongated gap between the opposing sides. The elongated gap faces the other of the bottom and the top. The folded antenna is a double-layer structure comprising a first layer continuous with or connected to a second layer. The first layer is disposed on exterior surfaces of shell, and the second layer is disposed on interior surfaces of the shell.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
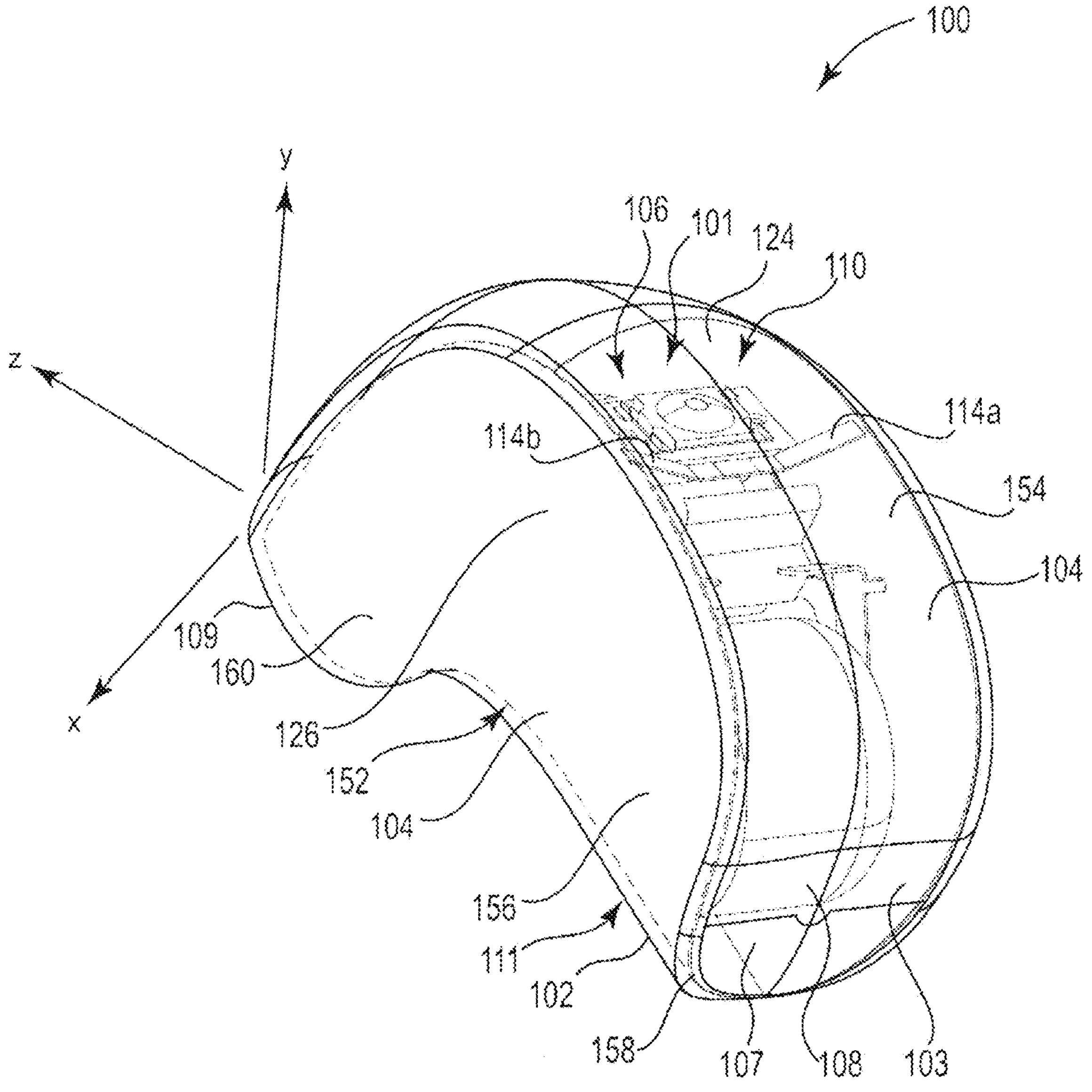
FIG. 1 illustrates a hearing device incorporating a folded antenna in accordance with various embodiments.

It is understood that the embodiments described herein may be used with any hearing device without departing from the scope of this disclosure. The devices depicted in the figures are intended to demonstrate the subject matter, but not in a limited, exhaustive, or exclusive sense. It is also understood that the present subject matter can be used with a device designed for use in or on the right ear or the left ear or both ears of the wearer.

Conventional hearing instruments typically include a dipole antenna. Achieving reliable ear-to-ear (E2E) communication using conventional dipole antenna is problematic without compromises such as battery life and latency. Moreover, the major electric field polarization of a conventional dipole antenna in a hearing instrument is parallel to the wearer's head, which inhibits launching of creeping waves required for E2E communications at 2.4 GHz. In addition, head loading leads to at least a 3 dB radiation efficiency loss in conventional dipole antennas.

Another problem is the increasing difficulty of a dipole antenna design in a smaller hearing instrument with a greater number of functionalities. A dipole antenna requires a half wavelength length approximately 62 mm at 2.4 GHz in free space. A more compact hearing instrument inevitably makes the antenna closer to more components. This closer proximity worsens the antenna performance due to stronger coupling along the antenna structures, increases the difficulties of antenna design, measurement, and assembly, and magnifies the degree of uncertainty. Additionally, current dipole antennas used in hearing instruments are not symmetric in order to accommodate different components along antenna arms and to increase the physical length of the antenna, leading to different TRP performance between hearing devices worn on left and right ears of a wearer.

Embodiments of the disclosure are directed to a hearing device which incorporates a folded antenna that generally conforms to surfaces of a shell of the hearing device. In some embodiments, the folded antenna is disposed completely within the shell of the hearing device. In other embodiments, the folded antenna is disposed completely outside the shell of the hearing device, with feeds extending through the shell wall to electrically connect with the folded antenna. In further embodiments, portions of the folded antenna are disposed inside and outside of the shell. In some embodiments, the folded antenna can be incorporated within the shell wall as an internal component of the wall. Embodiments of a folded antenna overcome the deficiencies of conventional dipole antenna discussed above.

Hearing devices of the present disclosure can incorporate a folded antenna coupled to a high-frequency radio, such as a 2.4 GHz radio. The folded antenna can cooperate with a radio that conforms to an IEEE 802.11 (e.g., WiFi®) or Bluetooth® (e.g., BLE, Bluetooth® 4.2 or 5.0) specification, for example. It is understood that a folded antenna may also be incorporated in hearing devices that employ other radios, such as a 900 MHz radio. Hearing devices that incorporate a folded antenna of the present disclosure can be configured communicate and interact with a wireless assistive listening system. Wireless assistive listening systems are useful in a variety of situations and venues where listening by persons with impaired hearing have difficulty discerning sound (e.g., a person speaking or an audio broadcast or presentation). Wireless assistive listening systems can be useful at venues such as theaters, museums, convention centers, music halls, classrooms, restaurants, conference rooms, bank teller stations or drive-up windows, point-of-purchase locations, and other private and public meeting places.

The term hearing devices refers to a wide variety of devices that can aid a person with impaired hearing. Hearing devices of the present disclosure include hearables (e.g., wearable earphones, headphones, virtual reality headsets), hearing aids (e.g., hearing instruments), cochlear implants, and bone-conduction devices, for example. Hearing devices can include a housing or shell within which various internal components are disposed. Typical internal components of a hearing device can include a signal processor, memory, power management circuitry, one or more communication devices (e.g., a radio and a near-field magnetic induction device), one or more antennas, one or more microphones, and a receiver/speaker, for example. Hearing devices can incorporate a communication device, such as a BLE transceiver, which can provide for enhanced connectivity with assistive listening systems. Hearing devices include, but are not limited to, behind-the-car (BTE), in-the-car (ITE), in-the-canal (ITC), invisible-in-canal (IIC), receiver-in-canal (RIC), receiver-in-the-car (RITE) or completely-in-the-canal (CIC) type hearing devices. Hearing devices can also be referred to as assistive listening devices in the context of assistive listening systems. Throughout this disclosure, reference is made to a "hearing device," which is understood to refer to a single hearing device or a pair of hearing devices.

FIG. 1 illustrates a hearing device incorporating a conformal folded antenna in accordance with various embodiments. In the embodiment shown in FIG. 1, the hearing device 100 is of a behind-the-car design. The hearing device 100 includes an enclosure in the form of a shell 102 which includes a first end 107 and an opposing second end 109.

The shell 102 also includes a bottom 111, a removable top or cap (removed in FIG. 1) opposing the bottom 111, and opposing sides 124 and 126, all of which extend between the first and second ends 107 and 109. As can be seen in FIG. 1, the shell 102 has a volume that is at a maximum near the first end 107, at a minimum near the second end 109, and incrementally reduces along a longitudinal axis defined between the first and second ends 107 and 109. A battery 108 is shown positioned proximate the first end 107. The first end 107 can be hingedly connected to the shell 102 or otherwise configured to move between closed and open positions for installing and removing the battery 108.

A spine 110 (best seen in FIG. 2) extends longitudinally within the shell 102 between the battery 108 and the second end 109. The spine 110 is a structure inside the shell 102 that supports the flexible circuit substrate and electronics 106 of the hearing device 100. The spine 110 includes supports or struts that are connected to interior surfaces 103 of the shell 102 and positionally fix the spine 110 within the shell 102.

In the embodiment shown in FIG. 1, a folded antenna 104 is disposed inside the shell 102 and has a shape that generally conforms to interior surfaces 103 of the shell 102. As such, the shape of the folded antenna 104 generally follows the shape of the shell wall. The folded antenna 104 is a substantially solid, folded structure that extends longitudinally along interior surfaces 103 of the shell 102. In some embodiments, the folded antenna 104 can incorporate a metal mesh or grid surrounded by solid metal. For example, a metal mesh or grid structure can be placed within an aperture of a metal frame that together define the folded antenna 104. Incorporating a metal mesh or grid pattern in the antenna structure can provide for a reduction in the area of the folded antenna 104.

The folded antenna 104 shown in FIG. 1 extends longitudinally along the bottom 111 and along the opposing sides 124 and 126 of the shell 102 between the first and second ends 107 and 109. As shown, the folded antenna 104 extends along nearly the entire axial length of the shell 102 (e.g., >90% of the shell's axial length). In some embodiments, the folded antenna 104 can extend along most, but not all, of the axial length of the shell 102 (e.g., between about 60% and 80% of the shell's axial length, such as 70%). In other embodiments, the folded antenna 104 can extend along an appreciable percentage of the axial length of the shell 102 (e.g., between about 30% and 50% of the shell's axial length, such as 40%).

The folded antenna 104 has a first end 158, a second and 160, and a belly 152 that extends axially between the first and second ends 158 and 160. The folded antenna 104 includes opposing first and second sides 154 and 156 that extend from the belly 152 at an angle (e.g., an acute angle). Depending on how the folded antenna 104 is oriented within the shell 102, the belly 152 can define a bottom or a top of the antenna 104. In the embodiments shown in FIGS. 1-3, for example, the belly 152 defines a bottom of the antenna 104.

Using a colloquial description, the folded antenna 104 can have a "taco" shape in accordance with some embodiments. Using a geometric description, the folded antenna 104 can have a saddle shape in accordance with some embodiments. The folded antenna 104 can have a generally U-shaped cross-section, for example. It is understood that the description of the folded antenna 104 as having a taco or saddle shape is for illustrative, non-limiting purposes, and that many other shapes or configurations of the folded antenna 104 are contemplated. Using an electrical description, the folded antenna 104 can be described as a unique type of electrically small loop antenna, symmetric folded patch antenna, magnetic dipole antenna, or differentially fed planar inverted F antenna or PIFA.

In some embodiments, the folded antenna 104 can have a deep profile, in which the opposing first and second sides 154 and 156 extend along a major (e.g., >50%) portion or the entirety of the first and second sides 124 and 126 of the shell 102 (e.g., in the y-direction). In other embodiments, the folded antenna 104 can have a shallow profile, in which the opposing first and second sides 154 and 156 extend along a minor (e.g., <50%) portion of the first and second sides 124 and 126 of the shell 102. In addition to having two opposing sides 154 and 156, the belly 152 of the folded antenna 104 can be curved along a longitudinal axis (e.g., along the z-axis in the +/−y-direction) of the antenna 104, allowing the belly 152 to conform to the curvature of the shell 102. More particularly, the belly 152 can have minima of curvature (or maxima depending on antenna orientation) at the first and second ends 158 and 160 and a maxima (or minima depending on antenna orientation) between the two ends 158 and 160. The belly 152 can also be curved relative to the longitudinal axis (e.g., left or right of the z-axis in the +/−x-direction) of the folded antenna 104.

The folded antenna 104 is positioned in close proximity to interior surfaces 103 of the shell 102 so that the folded antenna 104 encompasses at least part of the spine 110 and at least some of the electronics 106 of the hearing device 100. In some embodiments, the folded antenna 104 encompasses at least part of the spine 110, such as in the case of a shallow folded antenna 104. As shown, the folded antenna 104 encompasses the spine 110, all of the electronics 106, and the battery 108 of the hearing device 100. The components of the shell 102 considered encompassed by the folded antenna 104 are those components captured between the opposing sides 154 and 156 of the antenna 104. In an electrical context, components of the shell 102 considered encompassed by the folded antenna 104 are those components (e.g., spine 110 and/or electronics 106) that effectively become part of the matching network that serves to tune the antenna 104.

The opposing sides 154 and 156 of the folded antenna 104 form an elongated gap 101 that faces the top (removed in FIG. 1) of the shell 102. The elongated gap 101 serves as the effective radiator of the folded antenna 104. In this orientation, the belly 152 of the folded antenna 104 defines a bottom that is situated at or adjacent to the bottom 111 of the shell 102. As shown, the elongated gap 101 is oriented upwards from the wearer's ear towards the top of the head. A plane (e.g., a y-z plane) passing vertically through the elongated gap 101 is aligned substantially parallel with the wearer's head adjacent the car. With the hearing device 100 positioned on a wearer's ear/head in this orientation, the folded antenna 104 generates an electric field in a direction that can readily facilitate car-to-car communication with a hearing device positioned on the wearer's other ear, and provides an increase in performance far from the wearer's head.

More particularly, and with the hearing device 100 properly positioned on the wearer's ear, the folded antenna 104 in the shell 102 generates substantial amount of electric field that propagates parallel to the wearer's head with a perpendicular electric field polarization, which advantageously results in the generation of creeping waves that can propagate along the surface of the wearer's head to a hearing device positioned on the wearer's opposite ear. In other words, the direction of electric field propagation is parallel to the head, but the electric field polarization is normal to the wearer's head for the folded antenna 104. This advantage of the folded antenna 104 is particularly beneficial when incorporating a high-frequency radio, such as a 2.4 GHz BLE radio, in the hearing device 100. As was discussed previously, the direction of major electric field polarization of a hearing device incorporating a 2.4 GHz radio connected to a conventional dipole antenna is parallel (rather than perpendicular) to the wearer's head, which discourages production of creeping waves needed for ear-to-car communication.

Antenna feeds 114*a* and 114*b* electrically couple opposing sides 154 and 156 of the folded antenna 104 to a radio of the electronics 106. In general, the feeds 114*a* and 114*b* attach to the folded antenna 104 at locations biased toward the ends 158 and 160, rather than the middle, of the antenna 104. The location of the feeds 114*a* and 115*b* can be selected to optimize the input impedance, effective length, radiation efficiency, and other characteristics of the folded antenna 104.

Figure 2:
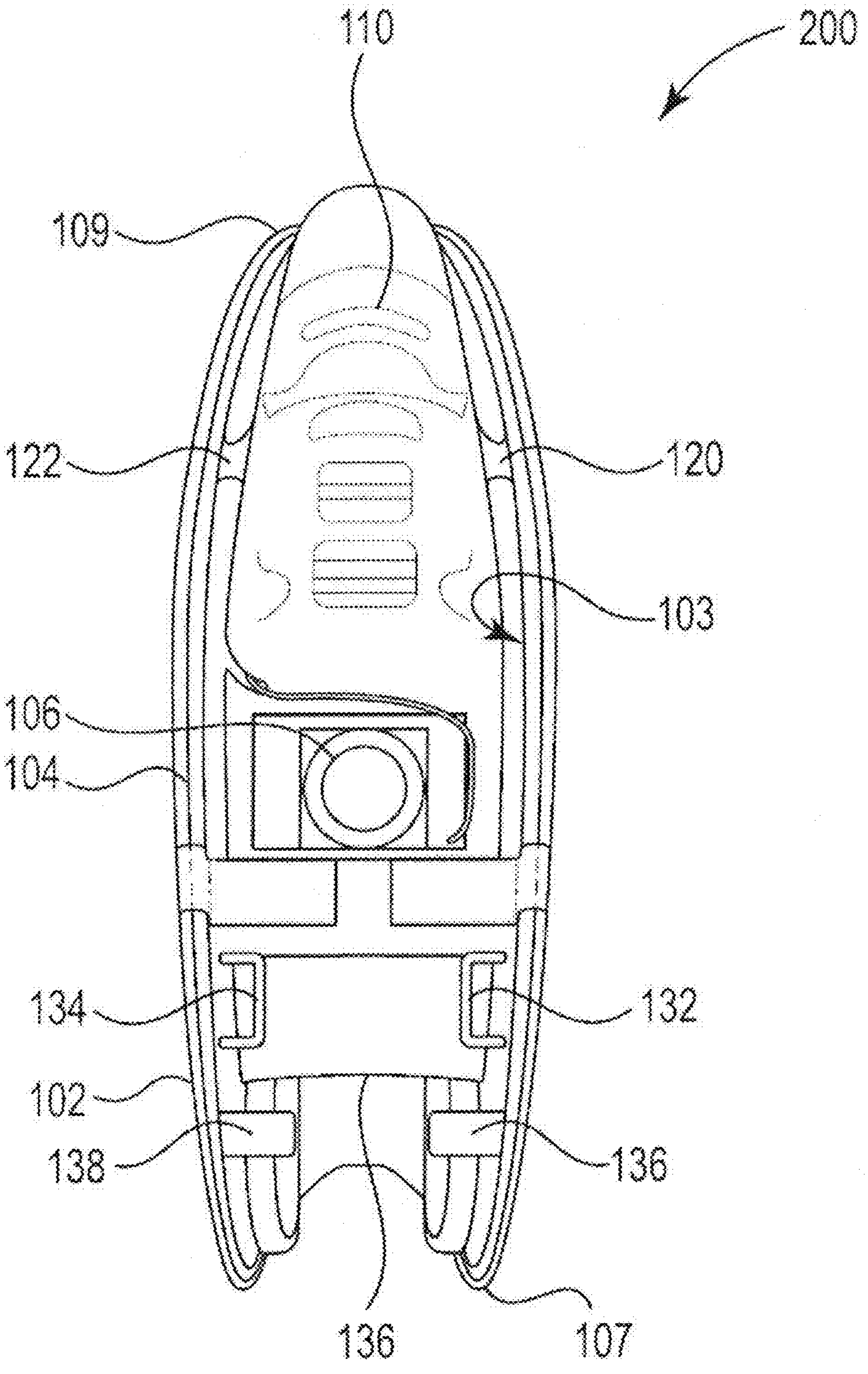
FIG. 2 illustrates additional features of a hearing device incorporating a folded antenna in accordance with various embodiments.

FIG. 2 illustrates additional features of a hearing device 200 incorporating a conformal folded antenna in accordance with various embodiments. In the embodiment shown in FIG. 2, a folded antenna 104 is positioned along the interior surfaces 103 of a shell 102. The top of the shell 102 is removed in FIG. 2 to allow viewing of the interior components of the hearing device 200. FIG. 2 shows a spine 110 positioned within the shell 102 and extending between first and second ends 107 and 109 of the shell 102. The spine 110 supports various electronics 106 of the hearing device 200, and has an end surface 136 that is recessed with respect to the first end 107 of the shell 102. This recess is dimensioned to receive a battery 128 (not shown).

The spine 110 and/or the folded antenna 104 can include a number of struts that extend between the spine 110 and an interior surface 103 of the shell 102. Depending on the location of the struts, some of the struts (e.g., 120 and 122) pass through apertures of the folded antenna 104, while other struts (e.g., 132, 134, 136, 138) extend from an interior surface 103 of the shell 102 above the antenna 104 and terminate at mounting locations at the spine 110. Because the folded antenna 104 is positioned between the shell 102 and the spine 110, the folded antenna 104 can include one or more apertures through which one or more struts (e.g., 120 and 122) can pass. Portions of the struts that pass through the antenna apertures can be electrically insulated from the folded antenna structure.

Figure 3:
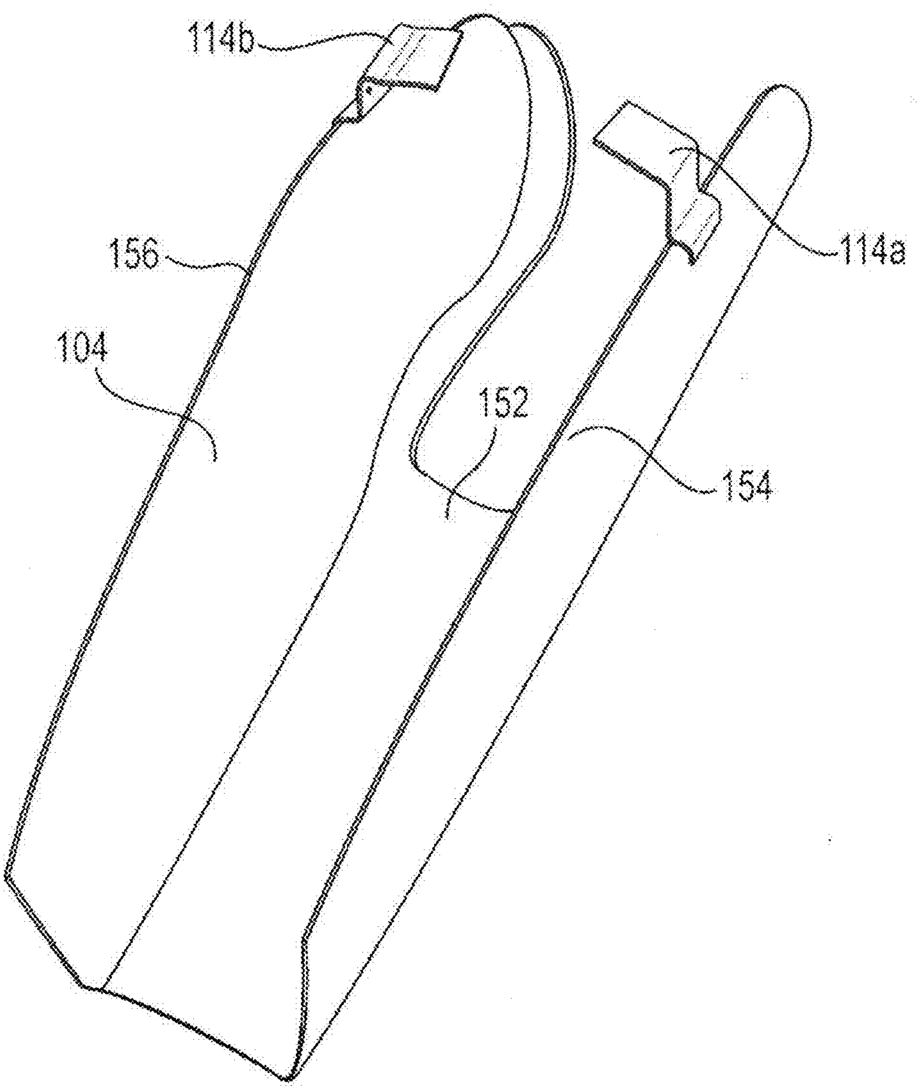
FIG. 3 illustrates a folded antenna of a hearing device in accordance with various embodiments.

FIG. 3 illustrates a folded antenna 104 of a hearing device in accordance with various embodiments. The folded antenna 104 shown in FIG. 3 includes first and second opposing sides 154 and 156 and a truncated belly 152 connecting the first and second opposing sides 154 and 156. In the embodiment shown in FIG. 3, the first and second opposing sides 154 and 156 have an axial length that extends beyond an axial length of the belly 152. Portions of the first and second opposing sides 154 and 156 that extend beyond the axial length of the belly 152 can be considered antenna extensions or wings. Feeds 114*a* and 114*b* can be electrically connected to the antenna extensions or wings, for example.

Figure 4:
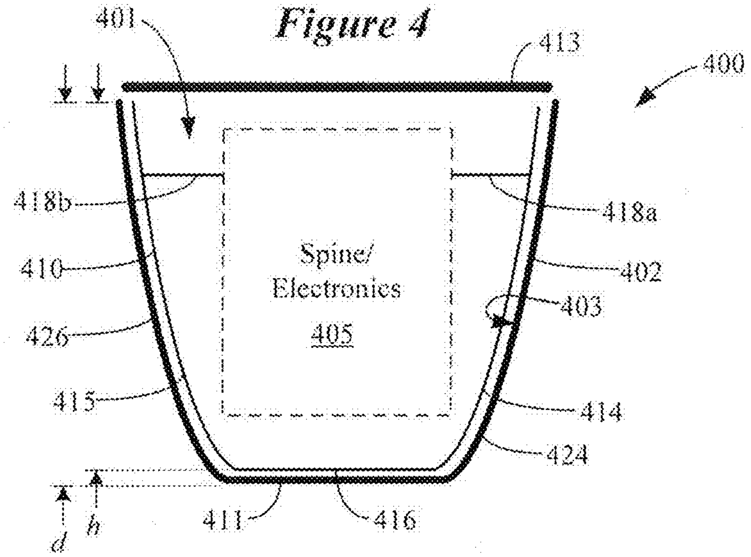
FIG. 4 illustrates a folded antenna disposed in the interior of a hearing device in accordance with various embodiments.

FIG. 4 is a cross-sectional view of a folded antenna of a hearing device in accordance with other embodiments. The hearing device 400 shown in FIG. 4 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 400, collectively shown as spine/electronics 405. Feeds 418*a* and 418*b* electrically connect a folded antenna 410 disposed within the shell 402 with a radio of the spine/electronics 405. The folded antenna 410 is shaped to generally conform to interior surfaces 403 of the shell 402, and encompasses at least part of the spine/electronics 405 of the hearing device 400.

The folded antenna 410 shown in FIG. 4 comprises a belly 416 that extends along the bottom 411 of the shell 402 and generally conforms to the shape of the bottom 411. Extending from the belly 416 of the folded antenna 410 are first and second opposing sides 414 and 415. The first and second opposing sides 414 and 415 extend along and generally conform to the shape of first and second sides 424 and 426 of the shell 402. Although not shown in the cross-sectional view of FIG. 4 (and other figures), it is understood that the folded antenna 410 extends axially (e.g., into and out of the page, such as along the z-axis shown in FIG. 1) along a longitudinal axis of shell 402. The folded antenna 410 has an elongated gap 401 defined between opposing first and second sides 414 and 415 of the antenna 410. In the embodiment shown in FIG. 4, the elongated gap 401 faces the top 413 of the shell 402. The first and second opposing sides 414 and 415 of the folded antenna 402 have a height, h, which is about the same as the depth, d, of the shell 402. In some configurations, the first and second opposing sides 414 and 415 have a height, h, which is between about 50% and 100% of the depth, d, of the shell 402 (e.g., >80% or 90% of d).

Figure 5:
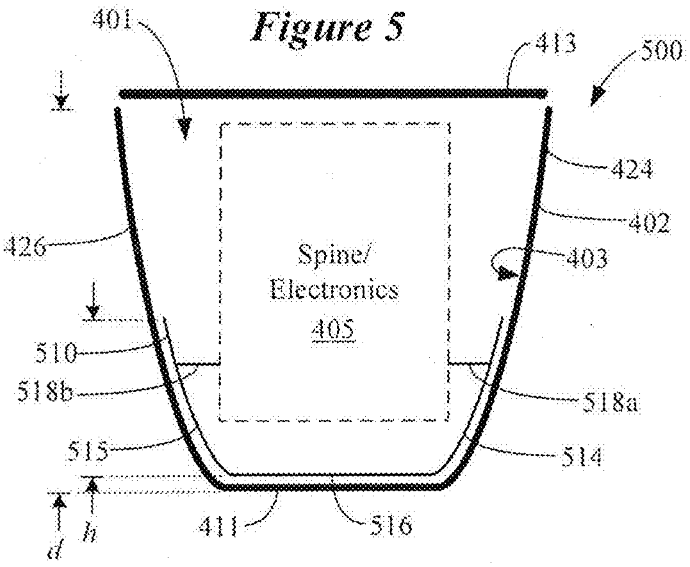
FIG. 5 illustrates a folded antenna disposed in the interior of a hearing device in accordance with some embodiments.

FIG. 5 illustrates a folded antenna of a hearing device in accordance with some embodiments. The hearing device 500 shown in FIG. 5 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 500, collectively shown as spine/electronics 405. Feeds 518*a* and 518*b* electrically connect a folded antenna 510 disposed within the shell 402 with a radio of the spine/electronics 405. The folded antenna 510 is shaped to generally conform to interior surfaces 403 of the shell 402, and encompasses at least part of the spine/electronics 405 of the hearing device 500.

The folded antenna 510 shown in FIG. 5 comprises a belly 516 that extends along the bottom 411 of the shell 402 and generally conforms to the shape of the bottom 411. Extending from the belly 516 are first and second opposing sides 514 and 515. The first and second opposing sides 514 and 515 extend along and generally conform to the shape of a limited portion of the first and second sides 424 and 426 of the shell 402. The folded antenna 510 has an elongated gap 401 defined between opposing first and second sides 514 and 515 of the antenna 510. In the embodiment shown in FIG. 5, the elongated gap 501 faces the top 413 of the shell 402. The first and second opposing sides 514 and 515 of the folded antenna 510 have a height, h, which is less than the depth, d, of the shell 402. More particularly, the first and second opposing sides 514 and 515 can have a height, h, which is less than about 50% of the depth, d, of the shell 402 (e.g., between ~20%-40% of d).

Figure 6:
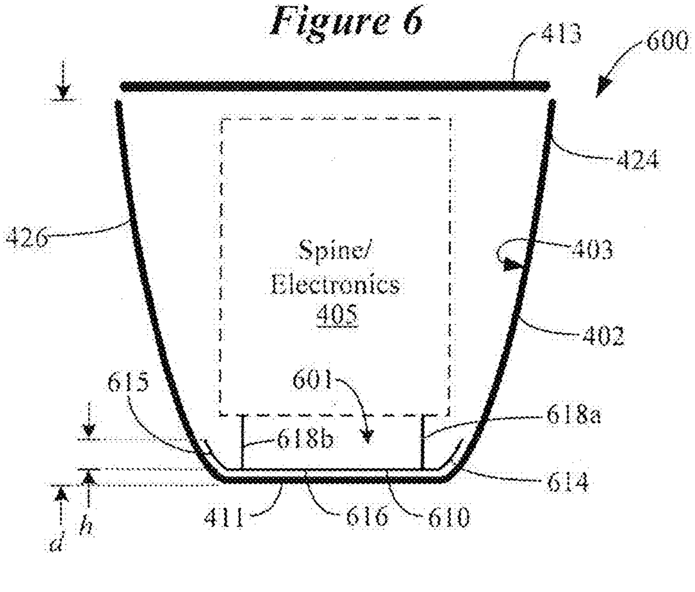
FIG. 6 illustrates a folded antenna disposed in the interior of a hearing device in accordance with other embodiments.

FIG. 6 illustrates a folded antenna of a hearing device in accordance with further embodiments. The hearing device 600 shown in FIG. 6 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 600, collectively shown as spine/electronics 405. Feeds 618*a* and 618*b* electrically connect a folded antenna 610 disposed within the shell 402 with a radio of the spine/electronics 405. The folded antenna 610 is shaped to generally conform to interior surfaces 403 of the shell 402. According to some embodiments, the folded antenna 610 is configured to encompass at least part of the spine/electronics 405 of the hearing device 600.

The folded antenna 610 shown in FIG. 6 comprises a belly 616 that extends along the bottom 411 of the shell 402 and generally conforms to the shape of the bottom 411. Extending from the belly 616 are first and second opposing sides 614 and 615 that extend along and generally conform to the shape of a limited portion of the first and second sides 424 and 426 of the shell 402. The folded antenna 610 has an elongated gap 601 defined between opposing first and second sides 614 and 615 which, in the embodiment shown in FIG. 6, faces the top 413 of the shell 402. The first and second opposing sides 614 and 615 of the folded antenna 610 have a height, h, which is less than about one-quarter of the depth, d, of the shell 402. More particularly, the first and second opposing sides 614 and 615 can have a height, h, which is less than about 25% of the depth, d, of the shell 402 (e.g., between ~0%-20% of d).

Figure 7:
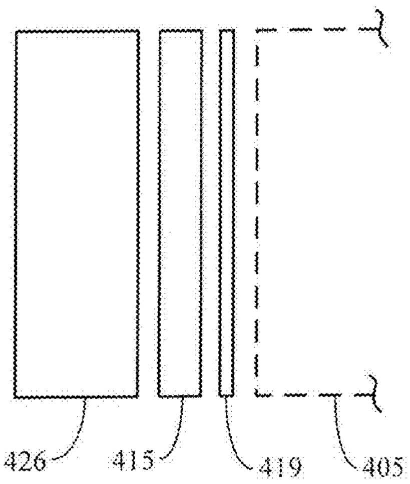
FIG. 7 is a cross-sectional view that shows a folded antenna disposed in the interior of a hearing device in accordance with various embodiments.

FIG. 7 is a cross-sectional view of a portion of a hearing device that includes a folded antenna in accordance with various embodiments. For purposes of illustration, FIG. 7 shows a portion of the hearing device 400 shown in FIG. 4, but can apply to other embodiments, such as those shown in FIGS. 5 and 6. FIG. 7 shows a second side 415 of a folded antenna 410 situated adjacent to a second side 426 of the hearing device's shell 402. An electrical insulator 419 (e.g., dielectric material) is disposed between the second side 415 of the folded antenna 410 and the spine/electronics 405 situated within the interior of the shell. In some embodiments, the insulator 419 can be a coating or layered material applied directly to the antenna surface. In other embodiments, the insulator 419 can be a separate electrically insulating structure. Suitable insulator materials 419 include polyester, polyetherimide, polyimide, polytetrafluoroethylene (PTFE), silicone, tape, paper, and air, for example.

Figure 8:
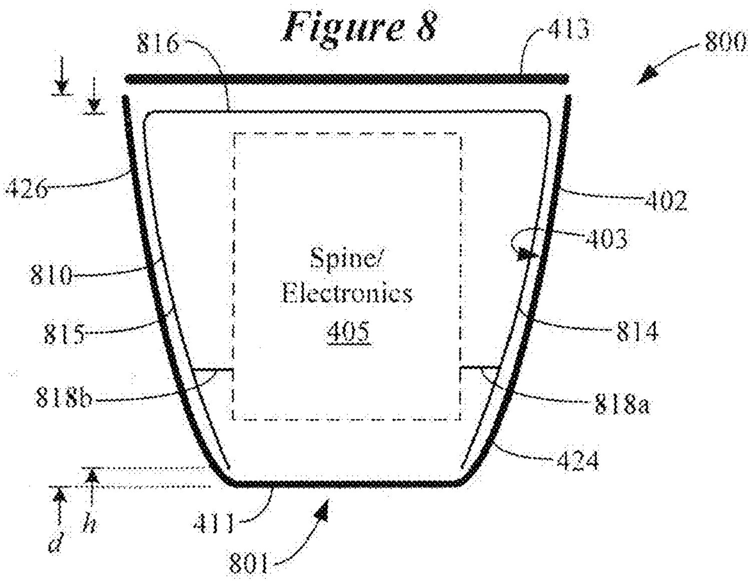
FIG. 8 illustrates a folded antenna disposed in the interior of a hearing device in accordance with various embodiments.

FIG. 8 illustrates a folded antenna of a hearing device in accordance with various embodiments. The hearing device 800 shown in FIG. 8 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 800, collectively shown as spine/electronics 405. Feeds **818*a* and 818*b* electrically connect a folded antenna 810 disposed within the shell 402 with a radio of the spine/electronics 405. The folded antenna 810 is shaped to generally conform to interior surfaces 403 of the shell 402, and encompasses at least part of the spine/electronics 405 of the hearing device 800**.

The folded antenna 810 shown in FIG. 8 comprises a belly 816 that extends along the top 413 of the shell 402 and generally conforms to the shape of the top 413. Extending from the belly 816 of the folded antenna 810 are first and second opposing sides 814 and 815 that extend along and generally conform to the shape of first and second sides 424 and 426 of the shell 402. The folded antenna 810 has an elongated gap 801 defined between opposing first and second sides 814 and 815 which, in the embodiment of FIG. 8, faces the bottom 411 of the shell 402. The first and second opposing sides 814 and 815 of the folded antenna 802 have a height, h, which is about the same as the depth, d, of the shell 402. In some configurations, the first and second opposing sides 814 and 815 have a height, h, which is between about 50% and 100% of the depth, d, of the shell 402 (e.g., >80% or 90% of d).

Figure 9:
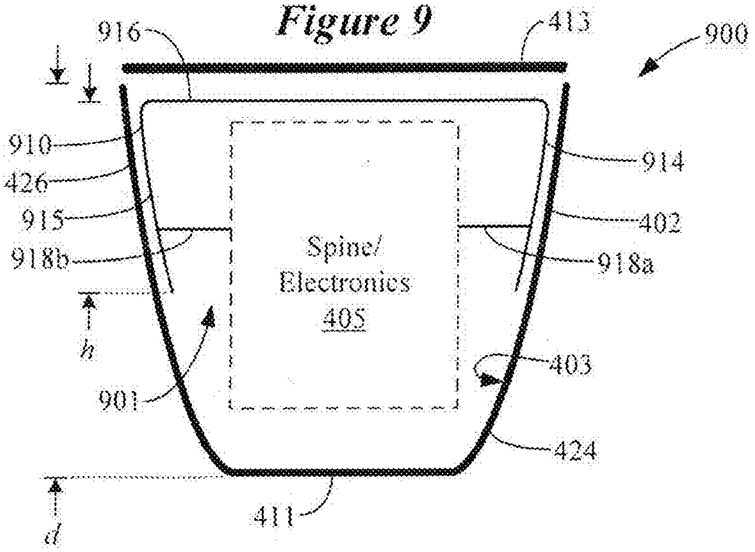
FIG. 9 illustrates a folded antenna disposed in the interior of a hearing device in accordance with some embodiments.

FIG. 9 illustrates a folded antenna of a hearing device in accordance with some embodiments. The hearing device 900 shown in FIG. 9 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 900, collectively shown as spine/electronics 405. Feeds **918*a* and 918*b* electrically connect a folded antenna 910 disposed within the shell 402 with a radio of the spine/electronics 405. The folded antenna 910 is shaped to generally conform to interior surfaces 403 of the shell 402, and encompasses at least part of the spine/electronics 405 of the hearing device 900**.

The folded antenna 910 shown in FIG. 9 comprises a belly 916 that extends along the top 413 of the shell 402 and generally conforms to the shape of the top 413. Extending from the belly 916 of the folded antenna 910 are first and second opposing sides 914 and 915 which extend along and generally conform to the shape of a limited portion of the first and second sides 424 and 426 of the shell 402. The folded antenna 910 has an elongated gap 901 defined between opposing first and second sides 914 and 915 which, in the embodiment shown in FIG. 9, faces the bottom 411 of the shell 402. The first and second opposing sides 914 and 915 of the folded antenna 902 have a height, h, which is less than the depth, d, of the shell 402. More particularly, the first and second opposing sides 914 and 915 can have a height, h, which is less than about 50% of the depth, d, of the shell 402 (e.g., between ~20%-40% of d).

Figure 10:
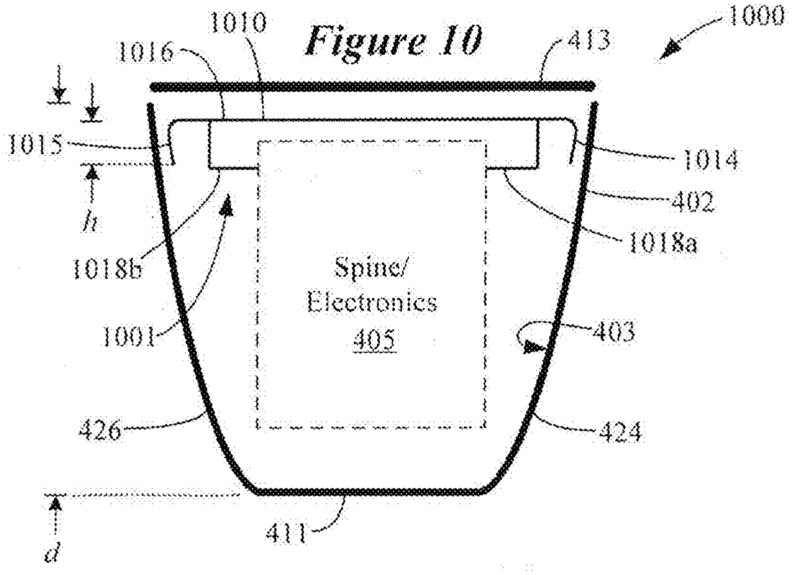
FIG. 10 illustrates a folded antenna disposed in the interior of a hearing device in accordance with other embodiments.

FIG. 10 illustrates a folded antenna of a hearing device in accordance with other embodiments. The hearing device 1000 shown in FIG. 10 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1000, collectively shown as spine/electronics 405. Feeds **1018*a* and 1018*b* electrically connect a folded antenna 1010 disposed within the shell 402 with a radio of the spine/electronics 405. The folded antenna 1010 is shaped to generally conform to interior surfaces 403 of the shell 402. In some embodiments, the folded antenna 1010 is configured to encompass at least part of the spine/electronics 405 of the hearing device 1000**.

The folded antenna 1010 shown in FIG. 10 comprises a belly 1016 that extends along the top 413 of the shell 402 and generally conforms to the shape of the top 413. Extending from the belly 1016 of the folded antenna 1010 are first and second opposing sides 1014 and 1015 that extend along and generally conform to the shape of a limited portion of the first and second sides 424 and 426 of the shell 402. The folded antenna 1010 has an elongated gap 1001 defined between opposing first and second sides 1014 and 1015 which, in the embodiment shown in FIG. 10, faces the bottom 411 of the shell 402. The first and second opposing sides 1014 and 1015 of the folded antenna 1010 have a height, h, which is less than about one-third or one-quarter of the depth, d, of the shell 402. For example, the first and second opposing sides 1014 and 1015 can have a height, h, which is less than about 25% of the depth, d, of the shell 402 (e.g., between ~0%-20% of d). It is noted that the embodiments shown in FIGS. 8-10 can incorporate an insulating coating or layer on or adjacent the folded antenna in a manner described previously with reference to FIG. 7.

Figure 11:
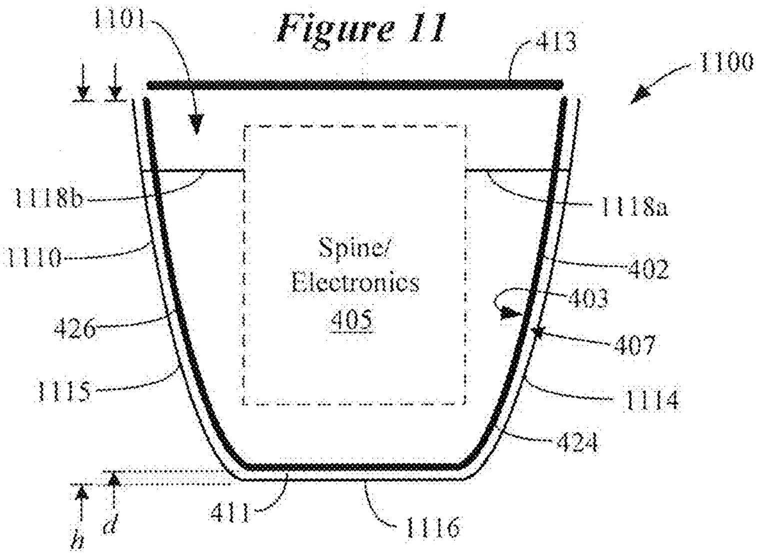
FIG. 11 illustrates a folded antenna disposed on the exterior of a hearing device in accordance with various embodiments.

FIG. 11 illustrates a hearing device incorporating a conformal folded antenna in accordance with various embodiments. In the embodiment shown in FIG. 11, the hearing device 1100 includes many of the structural and electrical components shown in FIG. 4. The embodiment of FIG. 11 differs from that of FIG. 4 in terms of the antenna implementation. In the embodiment shown in FIG. 11, the folded antenna 1110 is attached to the exterior surface 407 of the shell 402. The folded antenna 1110 has a shape that generally conforms to the exterior surface 407 of the shell 402, and can be attached thereto with an adhesive or other type of bonding. In some embodiments, the folded antenna 1110 shown in FIG. 11 and other figures can be formed as a laser direct structuring (LDS) component on the shell 402 (e.g., formed on the exterior surface 407 in FIG. 11). A protective coating (not shown in FIG. 11, but see FIG. 14) can be applied to the exterior surface of the folded antenna 1100.

The hearing device 1100 shown in FIG. 11 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1100, collectively shown as spine/electronics 405. Feeds 1118*a* and 1118*b* extend through the opposing sides 424 and 426 and electrically connect a folded antenna 1110 disposed within the shell 402 with a radio of the spine/electronics 405. Sealing material can be used to seal the apertures in the opposing sides 424 and 426 through which the feeds 1118*a* and 1118*b* pass. As previously discussed, the folded antenna 1110 is shaped to generally conform to exterior surfaces 407 of the shell 402, and encompasses at least part of the spine/electronics 405 of the hearing device 1100.

The folded antenna 1110 shown in FIG. 11 comprises a belly 1116 that extends along the bottom 411 of the shell 402 and generally conforms to the shape of the bottom 411. Extending from the belly 1116 are first and second opposing sides 1114 and 1115, which extend along and generally conform to the shape of first and second sides 424 and 426 of the shell 402. The folded antenna 1110 has an elongated gap 1101 defined between the opposing first and second sides 1114 and 1115. In the embodiment shown in FIG. 11, the elongated gap 1101 faces the top 413 of the shell 402. The first and second opposing sides 1114 and 1115 of the folded antenna 1102 have a height, h, which is about the same as or slightly greater than the depth, d, of the shell 402. In some configurations, the first and second opposing sides 1114 and 1115 have a height, h, which is between about 50% and 100% of the depth, d, of the shell 402 (e.g., >80% or 90% of d).

Figure 12:
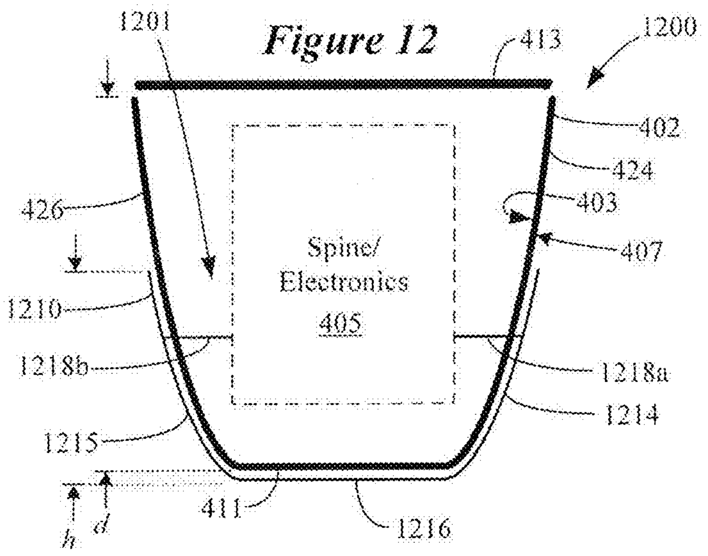
FIG. 12 illustrates a folded antenna disposed on the exterior of a hearing device in accordance with some embodiments.

FIG. 12 illustrates a hearing device incorporating a conformal folded antenna in accordance with various embodiments. The hearing device 1200 shown in FIG. 12 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1200, collectively shown as spine/electronics 405. Feeds 1218*a* and 1218*b* extend through the opposing sides 424 and 426 and electrically connect a folded antenna 1210 disposed within the shell 402 with a radio of the spine/electronics 405. Sealing material can be used to seal the apertures in the opposing sides 424 and 426 through which the feeds 1218*a* and 1218*b* pass. The folded antenna 1210 is shaped to generally conform to exterior surfaces 407 of the shell 402, and encompasses at least part of the spine/electronics 405 of the hearing device 1200.

The folded antenna 1210 shown in FIG. 12 comprises a belly 1216 that extends along the bottom 411 of the shell 402 and generally conforms to the shape of the bottom 411. Extending from the belly 1216 of the folded antenna 1210 are first and second opposing sides 1214 and 1215, which extend along and generally conform to the shape of a limited portion of the first and second sides 424 and 426 of the shell 402. The folded antenna 1210 has an elongated gap 1201 defined between the opposing first and second sides 1214 and 1215. In the embodiment shown in FIG. 12, the elongated gap 1201 faces the top 413 of the shell 402. The first and second opposing sides 1214 and 1215 of the folded antenna 1210 have a height, h, which is less than the depth, d, of the shell 402. More particularly, the first and second opposing sides 1214 and 1215 can have a height, h, which is less than about 50% of the depth, d, of the shell 402 (e.g., between ~20%-40% of d).

Figure 13:
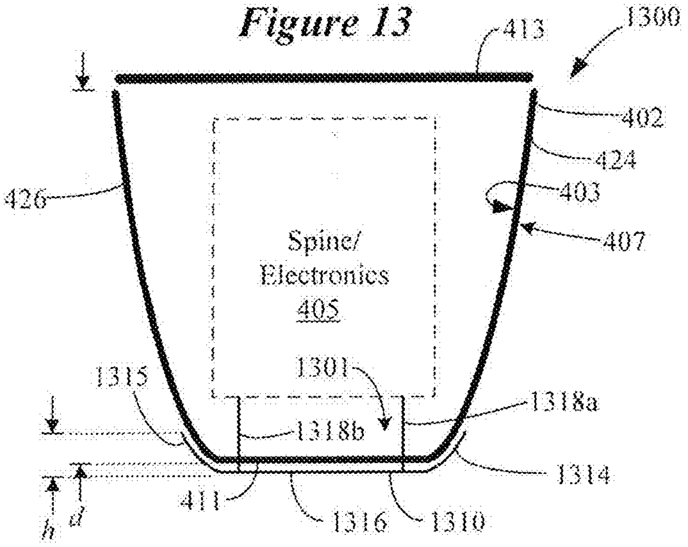
FIG. 13 illustrates a folded antenna disposed on the exterior of a hearing device in accordance with other embodiments.

FIG. 13 illustrates a hearing device incorporating a conformal folded antenna in accordance with some embodiments. The hearing device 1300 shown in FIG. 13 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1300, collectively shown as spine/electronics 405. Feeds 1318*a* and 1318*b* extend through the opposing sides 424 and 426 and electrically connect a folded antenna 1310 disposed within the shell 402 with a radio of the spine/electronics 405. Scaling material can be used to seal the apertures in the opposing sides 424 and 426 through which the feeds 1318*a* and 1318*b* pass. The folded antenna 1310 is shaped to generally conform to exterior surfaces 407 of the shell 402. In some embodiments, the folded antenna 1300 is configured to encompass at least part of the spine/electronics 405 of the hearing device 1300.

The folded antenna 1310 shown in FIG. 13 comprises a belly 1316 that extends along the bottom 411 of the shell 402 and generally conforms to the shape of the bottom 411. Extending from the belly 1316 of the folded antenna 1310 are first and second opposing sides 1314 and 1315 that extend along and generally conform to the shape of a limited portion of the first and second sides 424 and 426 of the shell 402. The folded antenna 1310 has an elongated gap 1301 defined between opposing first and second sides 1314 and 1315 which, in the embodiment shown in FIG. 13, faces the top 413 of the shell 402. The first and second opposing sides 1314 and 1315 of the folded antenna 1302 have a height, h, which is less than about one-third or one-quarter of the depth, d, of the shell 402. For example, the first and second opposing sides 1314 and 1315 can have a height, h, which is less than about 25% of the depth, d, of the shell 402 (e.g., between ~0%-20% of d).

Figure 14:
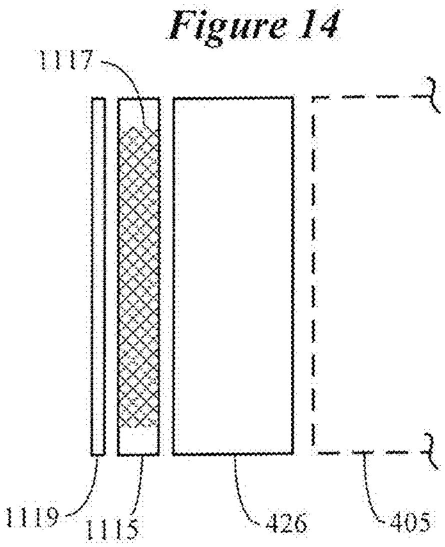
FIG. 14 is a cross-sectional view that shows a folded antenna disposed on the exterior of a hearing device in accordance with various embodiments.

FIG. 14 is a cross-sectional view of a portion of a hearing device that includes a folded antenna in accordance with various embodiments. For purposes of illustration, FIG. 14 shows a portion of the hearing device 1100 shown in FIG. 11, but can apply to other embodiments, such as those shown in FIGS. 12 and 13. FIG. 14 shows the spine/electronics 405 of the hearing device 1100 situated adjacent the second side 426 of the shell 402. FIG. 14 also shows a second side 1115 of a folded antenna 1110 situated adjacent the second side 426 of the shell 402. In some embodiments, and as shown in FIG. 14, the folded antenna 1110 can optionally incorporate a metal mesh or grid 1117 within an aperture of each side (e.g., first and second sides 1114 and 1115) of the folded antenna 1100. A protective material 1119 is disposed on the exterior surface of the second side 1115 (and the first side 1114) of the folded antenna 1110. The protective material 1119 can be a coating or one or more layers of protective material. Suitable materials 1119 can include those listed above with reference to FIG. 7, with the understanding that aesthetics are important since the protective material 1119 would be visible.

Figure 15:
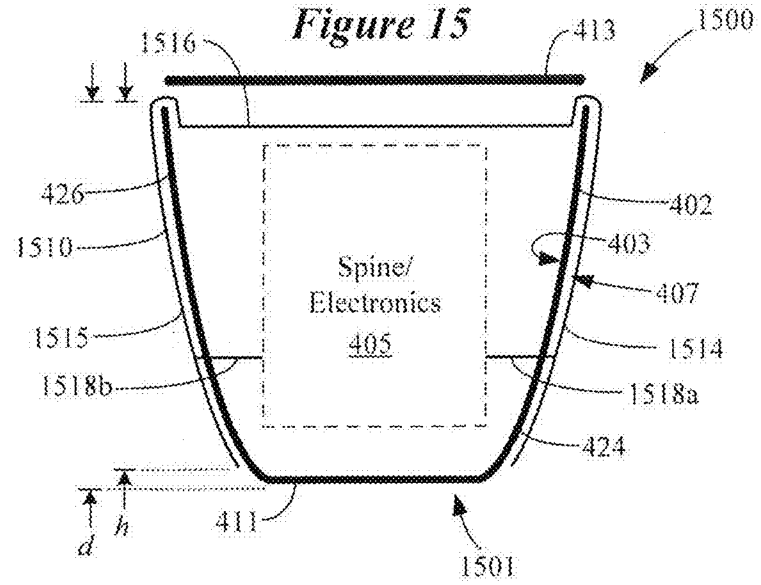
FIG. 15 illustrates a folded antenna disposed on the exterior of a hearing device in accordance with various embodiments.

FIG. 15 illustrates a folded antenna of a hearing device in accordance with various embodiments. The hearing device 1500 shown in FIG. 15 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1500, collectively shown as spine/electronics 405. Feeds **1518*a* and 1518*b* extend through the opposing sides 424 and 426 and electrically connect a folded antenna 1510 disposed on the exterior of the shell 402 with a radio of the spine/electronics 405. Sealing material can be used to seal the apertures in the opposing sides 424 and 426 through which the feeds 1518*a* and 1518*b* pass. The folded antenna 1510 is shaped to generally conform to exterior surfaces 407 of the shell 402, and encompasses at least part of the spine/electronics 405 of the hearing device 1500**.

The folded antenna 1510 shown in FIG. 15 comprises a belly 1516 that extends along the top 413 of the shell 402 and generally conforms to the shape of the top 413. Extending from the belly 1516 of the folded antenna 1510 are first and second opposing sides 1514 and 1515 that extend along and generally conform to the shape of first and second sides 424 and 426 of the shell 402. The folded antenna 1510 has an elongated gap 1501 defined between opposing first and second sides 1514 and 1515 which, in the embodiment of FIG. 15, faces the bottom 411 of the shell 402. The first and second opposing sides 1514 and 1515 of the folded antenna 1510 have a height, h, which is about the same as the depth, d, of the shell 402 (e.g., +/−10%). In some configurations, the first and second opposing sides 1514 and 1515 have a height, h, which is between about 50% and 100% of the depth, d, of the shell 402 (e.g., >80% or 90% of d).

Figure 16:
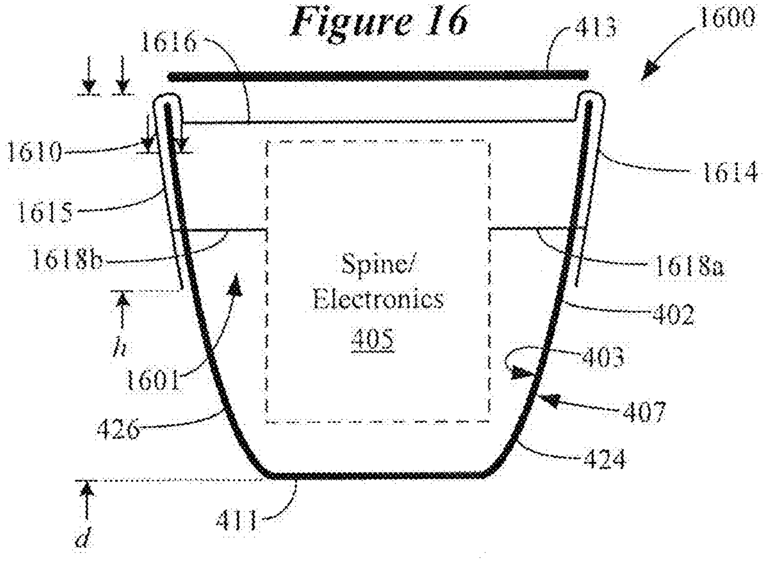
FIG. 16 illustrates a folded antenna disposed on the exterior of a hearing device in accordance with some embodiments.

FIG. 16 illustrates a folded antenna of a hearing device in accordance with some embodiments. The hearing device 1600 shown in FIG. 16 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1600, collectively shown as spine/electronics 405. Feeds **1618*a* and 1618*b* extend through the opposing sides 424 and 426 and electrically connect a folded antenna 1610 disposed on the exterior of the shell 402 with a radio of the spine/electronics 405. Sealing material can be used to seal the apertures in the opposing sides 424 and 426 through which the feeds 1618*a* and 1618*b* pass. The folded antenna 1610 is shaped to generally conform to exterior surfaces 407 of the shell 402, and encompasses at least part of the spine/electronics 405 of the hearing device 1600**.

The folded antenna 1610 shown in FIG. 16 comprises a belly 1616 that extends along the top 413 of the shell 402 and generally conforms to the shape of the top 413. Extending from the belly 1616 of the folded antenna 1610 are first and second opposing sides 1614 and 1615 which extend along and generally conform to the shape of a limited portion of the first and second sides 424 and 426 of the shell 402. The folded antenna 1610 has an elongated gap 1601 defined between opposing first and second sides 1614 and 1615 which, in the embodiment shown in FIG. 16, faces the bottom 411 of the shell 402. The first and second opposing sides 1614 and 1615 have a height, h, which is less than the depth, d, of the shell 402. More particularly, the first and second opposing sides 1614 and 1615 can have a height, h, which is less than about 50% of the depth, d, of the shell 402 (e.g., between ~20%-40% of d).

Figure 17:
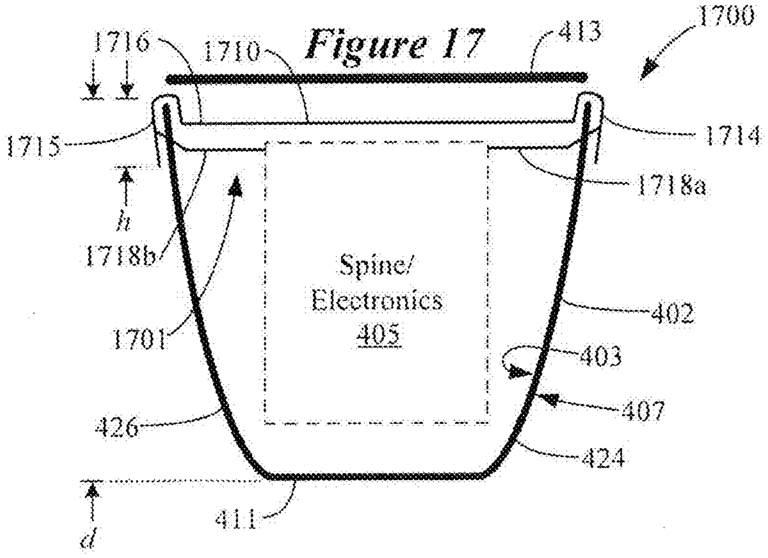
FIG. 17 illustrates a folded antenna disposed on the exterior of a hearing device in accordance with other embodiments.

FIG. 17 illustrates a folded antenna of a hearing device in accordance with other embodiments. The hearing device 1700 shown in FIG. 17 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1700, collectively shown as spine/electronics 405. Feeds **1718*a* and 1718*b* extend through the opposing sides 424 and 426 and electrically connect a folded antenna 1710 disposed on the exterior of the shell 402 with a radio of the spine/electronics 405. Scaling material can be used to seal the apertures in the opposing sides 424 and 426 through which the feeds 1718*a* and 1718*b* pass. The folded antenna 1710 is shaped to generally conform to exterior surfaces 407 of the shell 402. In some embodiments, the folded antenna 1710 is configured to encompass at least part of the spine/electronics 405 of the hearing device 1700**.

The folded antenna 1710 shown in FIG. 17 comprises a belly 1716 that extends along the top 413 of the shell 402 and generally conforms to the shape of the top 413. Extending from the belly 1716 are first and second opposing sides 1714 and 1715 that extend along and generally conform to the shape of a limited portion of the first and second sides 424 and 426 of the shell 402. The folded antenna 1710 has an elongated gap 1701 defined between opposing first and second sides 1714 and 1715 which, in the embodiment shown in FIG. 17, faces the bottom 411 of the shell 402. The first and second opposing sides 1714 and 1715 have a height, h, which is less than about one-third or one-quarter of the depth, d, of the shell 402. More particularly, the first and second opposing sides 1714 and 1715 can have a height, h, which is less than about 25% of the depth, d, of the shell 402 (e.g., between ~0%-20% of d). A protective material can be disposed on the exterior surface of the folded antennas shown in FIGS. 15-17. The protective material can be a coating or one or more layers of protective material. Suitable materials include those listed above with reference to FIG. 14 (e.g., layer(s) 1119).

Figure 18:
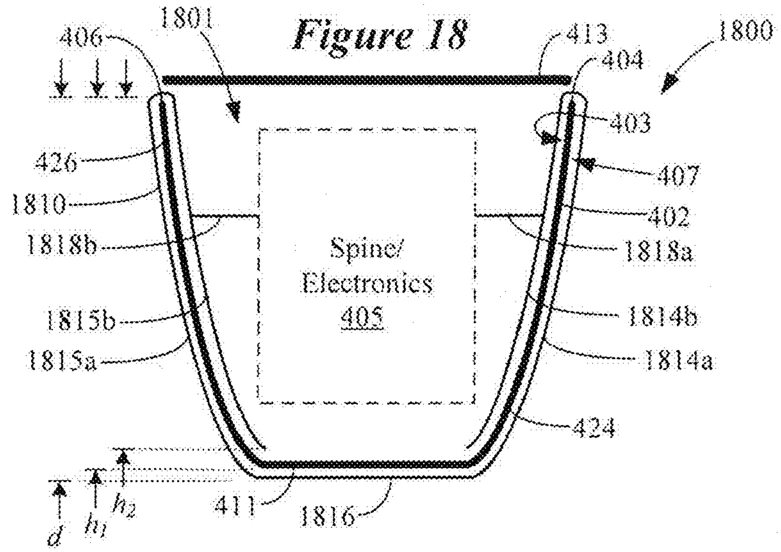
FIG. 18 illustrates a folded antenna disposed on the exterior and in the interior of a hearing device in accordance with various embodiments.

FIG. 18 illustrates a folded antenna of a hearing device in accordance with further embodiments. The hearing device 1800 shown in FIG. 18 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1800, collectively shown as spine/electronics 405. Feeds **1818*a* and 1818*b* electrically connect a folded antenna 1810 disposed on and within the shell 402 with a radio of the spine/electronics 405. The folded antenna 1810 is shaped to generally conform to exterior surfaces 407 and interior surfaces 403 of the shell 402. More specifically, the folded antenna 1810 shown in FIG. 18 is disposed on exterior surfaces 407 of the shell 402 and extends at least partially along interior surfaces 403 of the shell 402. In this regard, the folded antenna 1810 may be considered a double-layer folded antenna. The folded antenna 1810 is configured to encompass at least part of the spine/electronics 405 of the hearing device 1800**.

The folded antenna 1810 comprises a belly 1816 that extends along the bottom 411 (exterior) of the shell 402 and generally conforms to the shape of the bottom 411. Extending from the belly 1816 are first and second opposing exterior sides 1814*a* and 1815*a*. The first and second opposing exterior sides 1814*a* and 1815*a* extend along and generally conform to the shape of first and second sides 424 and 426 of the shell 402. The first and second opposing exterior sides 1814*a* and 1815*a* wrap around respective end surfaces 404 and 406 of the first and second sides 424 and 426 and extend along at least a portion of interior surfaces 403 of the shell 402 as first and second opposing interior sides 1814*b* and 1815*b*. The folded antenna 1810 has an elongated gap 1801 defined between opposing first and second sides 1814*a*/1814*b* and 1815*a*/1815*b*. In the embodiment shown in FIG. 18, the elongated gap 1801 faces the top 413 of the shell 402.

The first and second opposing exterior sides 1814*a* and 1815*a* of the folded antenna 1810 have a height, $h_1$, which is about the same as the depth, d, of the shell 402 (e.g., +/−10%). The first and second opposing interior sides 1814*b* and 1815*b* of the folded antenna 1810 have a height, $h_2$, which can be about the same as the depth, d, of the shell 402 (e.g., +/−10%). In some configurations, the first and second opposing interior sides 1814*b* and 1815*b* have a height, $h_2$, which is between about 50% and 100% of the depth, d, of the shell 402 (e.g., >80% or 90% of d).

Figure 19:
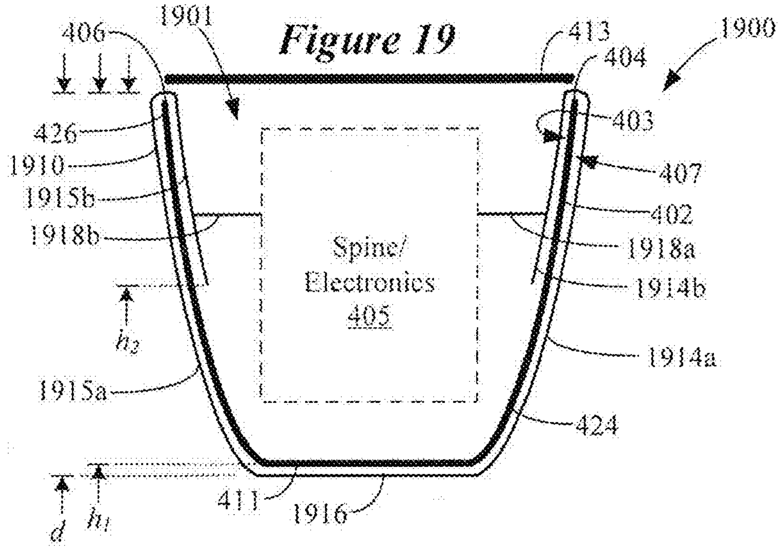
FIG. 19 illustrates a folded antenna disposed on the exterior and in the interior of a hearing device in accordance with some embodiments.

FIG. 19 illustrates a folded antenna of a hearing device in accordance with further embodiments. The hearing device 1900 shown in FIG. 19 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 1900, collectively shown as spine/electronics 405. Feeds 1918*a* and 1918*b* electrically connect a folded antenna 1910 disposed on and within the shell 402 with a radio of the spine/electronics 405. The folded antenna 1910 is shaped to generally conform to exterior surfaces 407 and interior surfaces 403 of the shell 402. More specifically, the folded antenna 1910 shown in FIG. 19 is disposed on exterior surfaces 407 of the shell 402 and extends at least partially along interior surfaces 403 of the shell 402. In this regard, the folded antenna 1910 may be considered a double-layer folded antenna. The folded antenna 1910 is configured to encompass at least part of the spine/electronics 405 of the hearing device 1900.

The folded antenna 1910 comprises a belly 1916 that extends along the bottom 411 (exterior) of the shell 402 and generally conforms to the shape of the bottom 411. Extending from the belly 1916 are first and second opposing exterior sides 1914*a* and 1915*a*. The first and second opposing exterior sides 1914*a* and 1915*a* extend along and generally conform to the shape of first and second sides 424 and 426 of the shell 402. The first and second opposing exterior sides 1914*a* and 1915*a* wrap around respective end surfaces 404 and 406 of the first and second sides 424 and 426 and extend along at least a portion of interior surfaces 403 of the shell 402 as first and second opposing interior sides 1914*b* and 1915*b*. The folded antenna 1910 has an elongated gap 1901 defined between opposing first and second sides 1914*a*/1914*b* and 1915*a*/1915*b*. In the embodiment shown in FIG. 19, the elongated gap 1901 faces the top 413 of the shell 402.

The first and second opposing exterior sides 1914*a* and 1915*a* of the folded antenna 1910 have a height, $h_1$, which is about the same as the depth, d, of the shell 402 (e.g., +/−10%). The first and second opposing interior sides 1914*b* and 1915*b* of the folded antenna 1910 have a height, $h_2$, which is less than the depth, d, of the shell 402. In some configurations, the first and second opposing interior sides 1914*b* and 1915*b* have a height, $h_2$, which is less than about 50% of the depth, d, of the shell 402 (e.g., between ~10%-40% of d).

Figure 20:
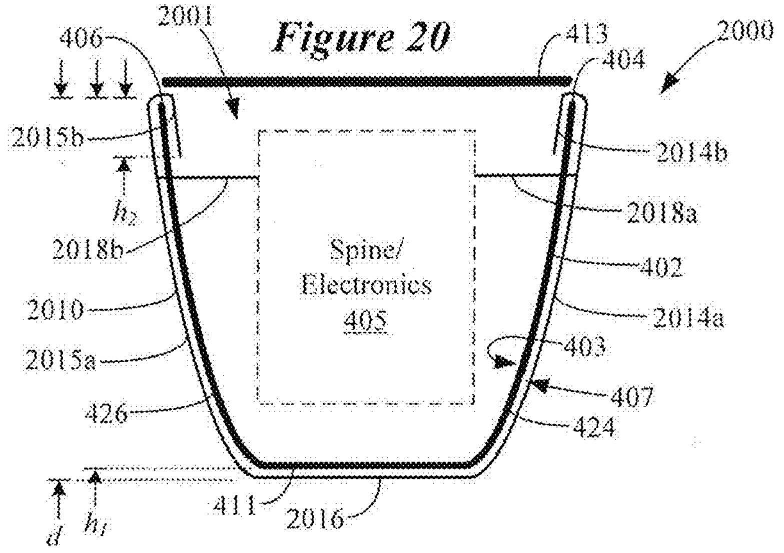
FIG. 20 illustrates a folded antenna disposed on the exterior and in the interior of a hearing device in accordance with other embodiments.

FIG. 20 illustrates a folded antenna of a hearing device in accordance with some embodiments. The hearing device 2000 shown in FIG. 20 includes a shell 402 comprising a first side 424, an opposing second side 426, a bottom 411, and a removable top 413. The shell 402 has a depth, d, defined between the bottom 411 and the top 413 (when attached). Disposed within the shell 402 is a spine which supports electronics of the hearing device 2000, collectively shown as spine/electronics 405. Feeds 2018*a* and 2018*b* electrically connect a folded antenna 2010 disposed on and within the shell 402 with a radio of the spine/electronics 405. The folded antenna 2010 is shaped to generally conform to exterior surfaces 407 and interior surfaces 403 of the shell 402. More specifically, the folded antenna 2010 shown in FIG. 20 is disposed on exterior surfaces 407 of the shell 402 and extends at least partially along interior surfaces 403 of the shell 402. In this regard, the folded antenna 2010 may be considered a double-layer folded antenna. In some embodiments, the folded antenna 2010 is configured to encompass at least part of the spine/electronics 405 of the hearing device 2000.

The folded antenna 2010 comprises a belly 2016 that extends along the bottom 411 (exterior) of the shell 402 and generally conforms to the shape of the bottom 411. Extending from the belly 2016 are first and second opposing exterior sides 2014*a* and 2015*a*. The first and second opposing exterior sides 2014*a* and 2015*a* extend along and generally conform to the shape of first and second sides 424 and 426 of the shell 402. The first and second opposing exterior sides 2014*a* and 2015*a* wrap around respective end surfaces 404 and 406 of the first and second sides 425 and 426 and extend along at least a portion of interior surfaces 403 of the shell 402 as first and second opposing interior sides 2014*b* and 2015*b*. The folded antenna 2010 has an elongated gap 2001 defined between opposing first and second sides 2014*a*/2014*b* and 2015*a*/2015*b*. In the embodiment shown in FIG. 20, the elongated gap 2001 faces the top 413 of the shell 402. The first and second opposing exterior sides 2014*a* and 2015*a* of the folded antenna 2010 have a height, $h_1$, which is about the same as the depth, d, of the shell 402 (e.g., +/−10%). The first and second opposing interior sides 2014*b* and 2015*b* of the folded antenna 2010 have a height, $h_2$, which is less than about 25% of the depth, d, of the shell 402 (e.g., between ~0%-20% of d).

A protective material can be disposed on the exterior surface of the folded antennas shown in FIGS. 18-20. The protective material can be a coating or one or more layers of protective material. Suitable materials include those listed above with reference to FIG. 14 (e.g., layer(s) 1119). An electrical insulator (e.g., dielectric material) can be disposed between interior portions of the folded antennas shown in FIGS. 18-12 and the spine/electronics 405. In some embodiments, the insulator can be a coating or layered material applied directly to the antenna surface (e.g., layer(s) 419 shown in FIG. 7).

Embodiments of a folded antenna discussed hereinabove are configured to encompass at least some of the spine/electronics disposed within the shell of the hearing device. The spine and/or electronics can serve as a loading dielectric that can increase the effective length of the folded antenna. The spine and/or electronics disposed within the shell can also become part of the matching network that effectively tunes the folded antenna. In some embodiments, portions of the folded antenna extend along at least some of the interior surfaces of the shell, which effectively serves as a tuning capacitor for the folded antenna (e.g., for tuning the input impedance through a distributed capacitance effect). The feed location of the folded antenna can be adjusted along the elongated gap to provide reasonable impedance to be matched relatively easily. It can be appreciated that the configuration and dimensions of the folded antenna can be adjusted to achieve desired antenna performance characteristics.

Figure 21:
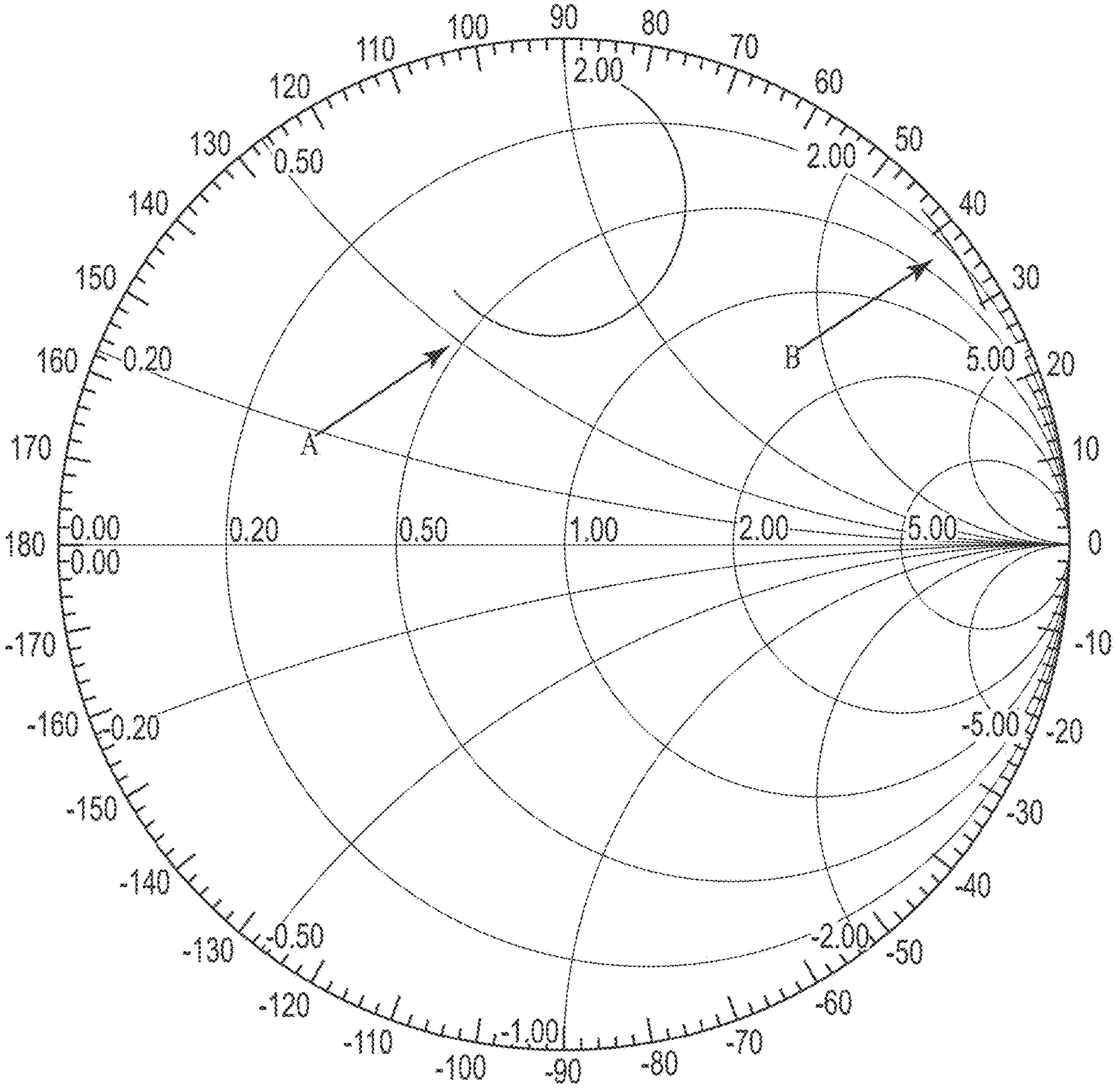
FIG. 21 is a Smith chart that shows an improvement in impedance matching of a folded antenna by encompassing internal components disposed within a hearing device in accordance with various embodiments.

FIG. 21 is a Smith chart that demonstrates the improvement in impedance matching of the folded antenna by encompassing internal components (e.g., spine, electronics such as flex circuits, battery, receiver, etc.) disposed within the shell of the hearing device. Curve B shows the impedance matching characteristics of a folded antenna disposed within a hearing device shell devoid of a spine and electronics. Curve A shows the impedance matching characteristics of the folded antenna disposed within a hearing device which includes a spine and electronics. FIG. 21 demonstrates that the presence of the spine and/or electronics within the shell improves the impedance matching characteristics of the folded antenna.

Figure 23:
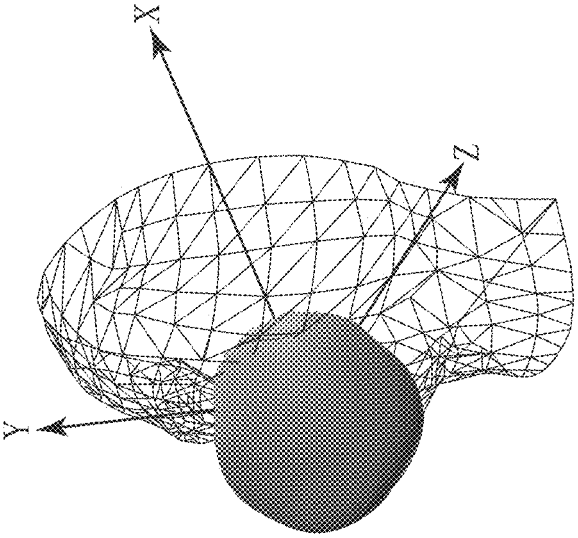
FIG. 23 illustrates the three-dimensional radiation pattern of a folded antenna when positioned on the wearer's ear immediately adjacent the head in accordance with various embodiments.
Figure 22:
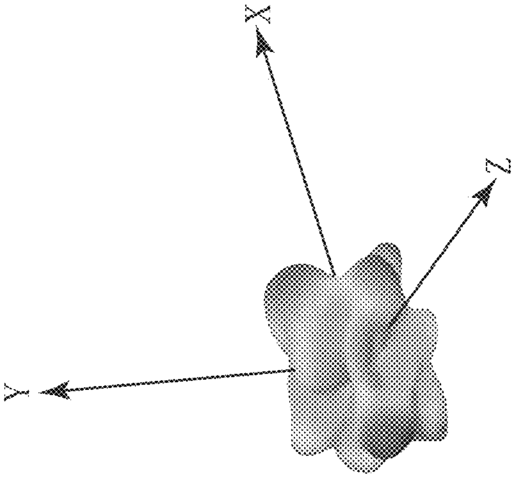
FIG. 22 illustrates the three-dimensional radiation pattern of a folded antenna in free space in accordance with various embodiments.

The human head significantly impacts the performance of a folded antenna disposed in a hearing device when the hearing device is properly positioned on the car of a wearer. The three-dimensional radiation pattern of a representative folded antenna in free space is illustrated in FIG. 22. FIG. 23 illustrates the three-dimensional radiation pattern of the representative folded antenna when positioned on the wearer's ear immediately adjacent the head. As is evident in FIGS. 22 and 23, head loading significantly improves the performance of the folded antenna. More particularly, head loading makes the folded antenna form smooth approximately semi-sphere coverage as is shown in FIG. 23. The head-loaded folded antenna has right E-field polarization which is substantially normal to the head and a significant amount of radiated power at the hearing device/head interface plane (the y-z plane), which is important for effecting reliable ear-to-ear communication.

Figure 24:
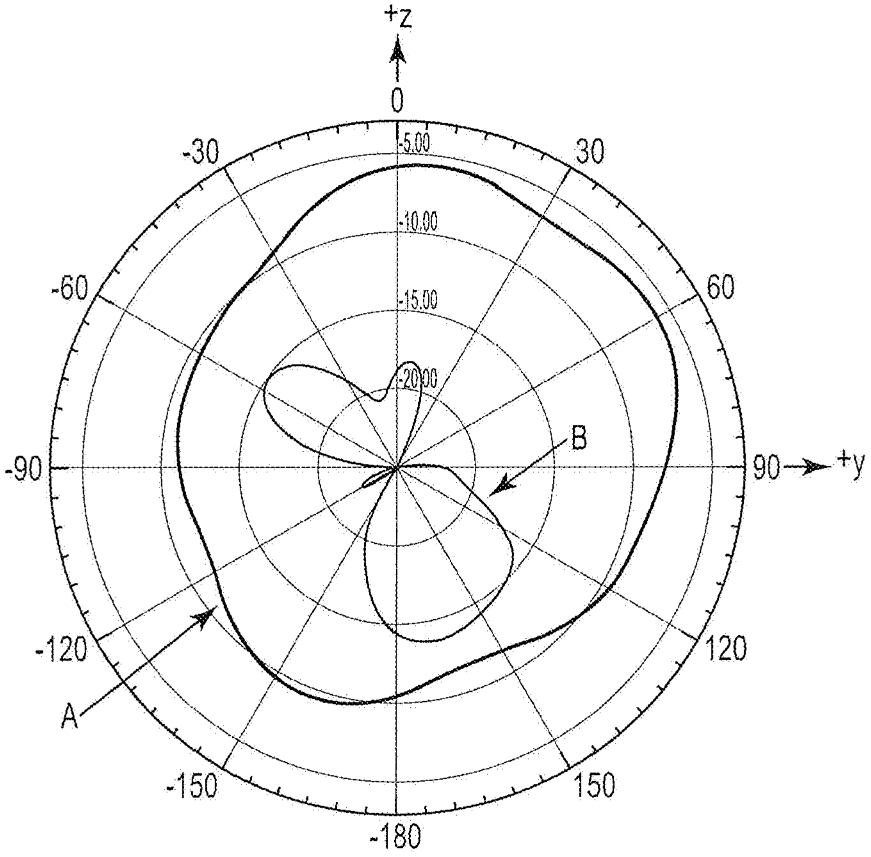
FIG. 24 is a two-dimensional gain pattern at the y-z plane showing significant power radiated by a folded antenna is directed around the back of the head to facilitate ear-to-ear communication in accordance with various embodiments.

The two-dimensional gain pattern of FIG. 24, for example, shows significant power is directed around the back of the head (curve A), which is an indicator that creeping waves can be launched to facilitate ear-to-ear communication. In FIG. 24, curve A (vertical polarization to head) and curve B (horizontal polarization to head) show antenna gain patterns parallel to the head (e.g., the y-z plane shown in FIG. 23). Stronger creeping waves can be launched using a folded antenna because of the stronger radiation pattern directed toward the back surface of the head. It is noted that, in FIG. 24, the +x and +y axes are indicated, which correspond to x and y axes shown in FIG. 23.

It is known that conventional dipole antennas can be affected severely (e.g., at least by 3 dB) by head loading. In contrast, a folded antenna in accordance with embodiments of the present disclosure has about the same level of radiation efficiency in free space and on the head, as is evidenced in Table 1 below.

TABLE 1

| Freq (GHz) | On-head Radiation Efficiency (dB) | Free-space Radiation Efficiency (dB) |
|---|---|---|
| 2.40 | −7.45 | −7.45 |
| 2.42 | −7.45 | −7.83 |
| 2.44 | −7.46 | −7.62 |
| 2.46 | −7.39 | −7.42 |
| 2.48 | −7.43 | −7.79 |

Figure 25:
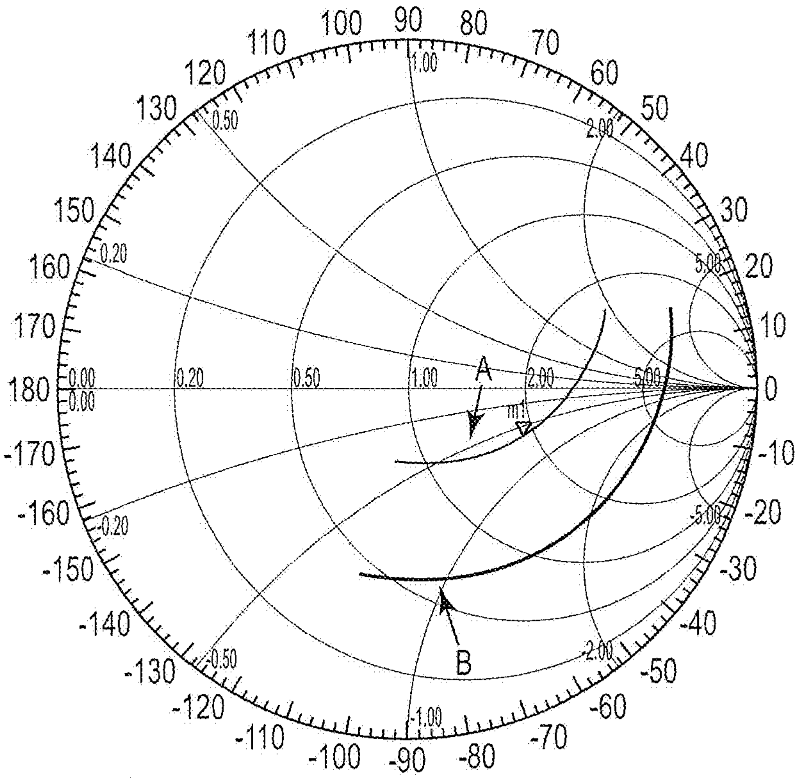
FIG. 25 provides a Smith chart of a folded antenna on-head and in free space in accordance with various embodiments.

Moreover, head loading improves the impedance matching condition as is shown in FIG. 25. FIG. 25 provides an S-parameter comparison of a folded antenna on-head (curve A) and in free space (curve B). FIG. 25 shows an improved impedance matching condition when the folded antenna is properly positioned on the wearer's ear immediately adjacent the head.

Figure 26:
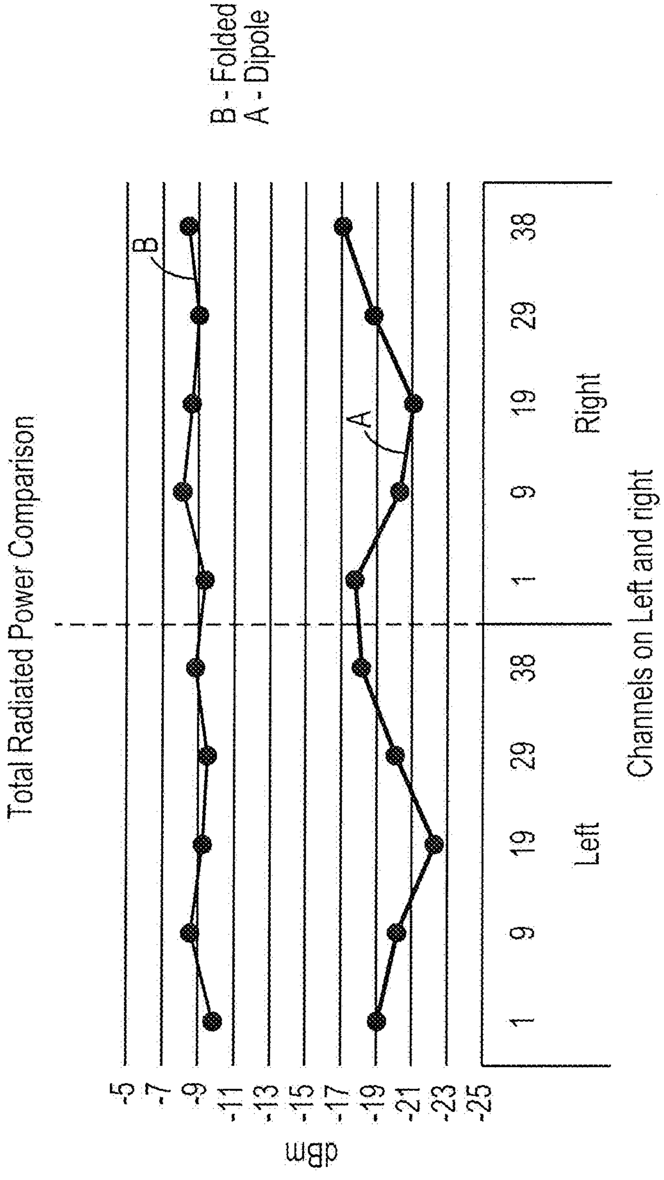
FIG. 26 shows plots of total radiated power (TRP) for different antenna topologies including a folded antenna according to various embodiments.

An experiment was performed on a test head to compare the total radiated power for different antenna topologies. FIG. 26 shows the graphical results of this experiment. In the experiment, two different antenna topologies were evaluated; a conventional dipole antenna (curve A) and a folded antenna (curve B) implemented in accordance with the present disclosure. The graph of FIG. 26 is divided between the channels on the left car and channels on the right car. The frequency associated with each channel can be calculated using the formula 2402 MHz+(2×Channel Number) in MHz. For example, Channel 38 corresponds to a frequency of 2402 MHz+(2×38) MHz=2478 MHz (or 2.478 GHz).

Figure 27:
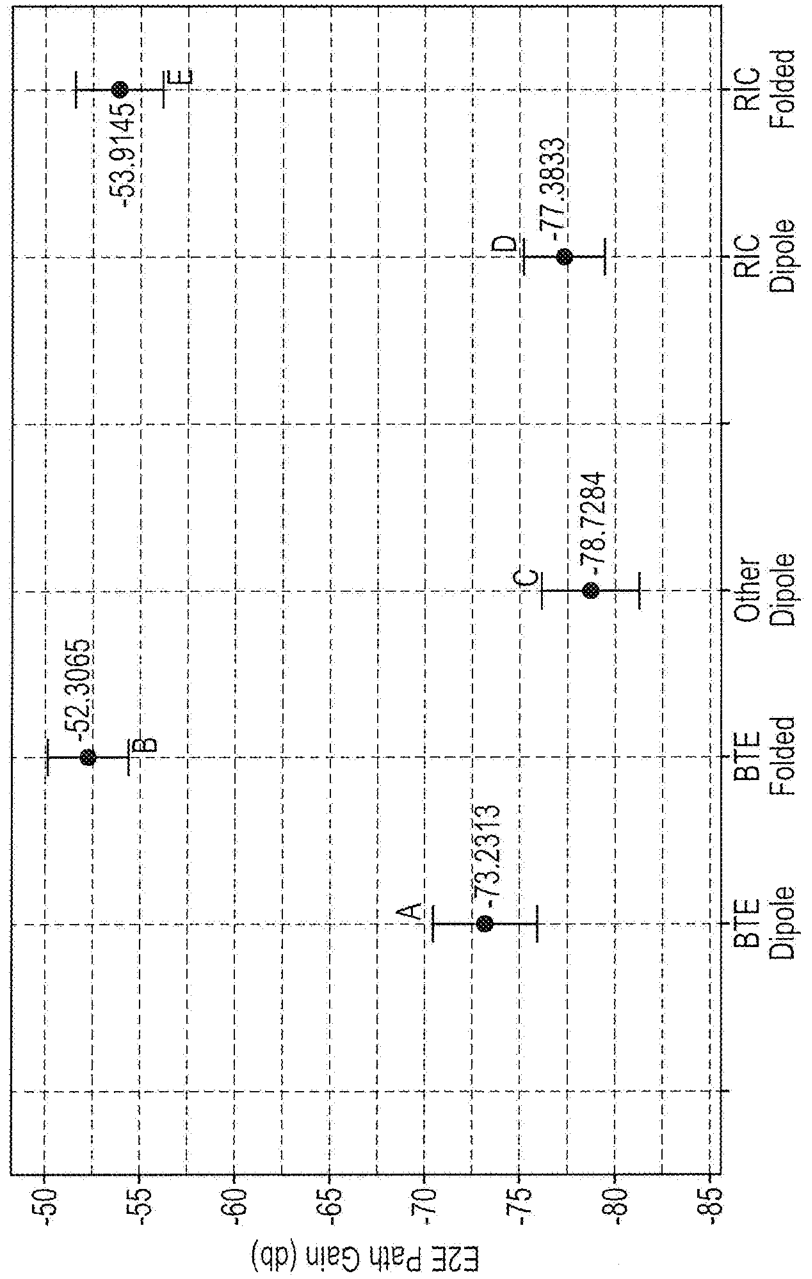
FIG. 27 shows ear-to-ear path gain data for different antenna topologies including a folded antenna according to various embodiments.

Symmetry between left and right channels can be evaluated by comparing the TRP value for a given antenna topology at corresponding left and right channel numbers. For example, left and right channel number 19 for the dipole antenna (curve A) has corresponding TRP values of ~−23 and ~−21 dBm, indicating asymmetric performance of approximately 2 dBm. In contrast, the folded antenna (curve B) shows superior symmetric performance between left and right channels (e.g., <~0.5 dBm). The data shown in FIG. 28 demonstrates that the folded antenna has superior TRP (stays above −10 dBm across the frequency band) and excellent symmetric performance for left and right sides on the head. Another experiment was conducted to compare car-to-car path gains for different antenna topologies on 20 wearers. These data are summarized in FIG. 27. The mean E2E path gain (in dB) for each antenna topology is plotted in FIG. 27, along with an interval indicative of the standard deviation associated with each mean value. The antenna topologies subject to evaluation include a BTE dipole antenna (A), a BTE folded antenna of the present disclosure (B), another dipole antenna (C), a RIC Dipole antenna (D), and a RIC folded antenna of the present disclosure (E). The data shown in FIG. 27 demonstrates that the folded antennas (B) and (E) significantly outperform all of the conventional antennas in terms of E2E path gain. For example, the folded antennas (B) and (E) perform at least 20 dB better than the conventional dipole antennas (A), (C), and (D). FIG. 27 demonstrates that folded antennas of the present disclosure provide for superior car-to-car communication over conventional antenna topologies.

A folded antenna according to the some embodiments can be a contiguous unitary structure. For example, the folded antenna can be a continuous structure that is substantially solid except for apertures needed to accommodate elements of the hearing device (e.g., struts, electrical/magnetic components). For example, the folded antenna can be notched to mitigate interference with near-field coil antennas for other wireless communication systems of the hearing device. The shape of the folded antenna's edge can be optimized to meet industrial design and wireless performance requirements.

In some embodiments, the folded antenna constitutes a stamped metal structure. In other embodiments, the folded antenna constitutes a metal plated structure. For example, the folded antenna can be plated inside and/or outside of the shell, essentially forming a solid metalized shell. A folded antenna according to other embodiments can be a discontinuous structure comprising a multiplicity of connected antenna portions. For example, the folded antenna can be split into several parts with tight coupling between each part to make the antenna more manufacturable, for example, using flex printed circuit board technology. For example, the folded antenna can comprise a conductive layer on a flexible printed circuit board. By way of further example, the folded antenna can be laser direct structuring (LDS) structure.

This document discloses numerous embodiments, including but not limited to the following:

Item 1 is a hearing device adapted to be worn by a wearer, comprising:

a shell configured for placement on an exterior surface of an ear of the wearer, the shell comprising a first end, a second end, a bottom, a top, and opposing sides, wherein the bottom, top, and opposing sides extend between the first and second ends;

circuitry provided within the shell comprising at least a microphone, signal processing circuitry, radio circuitry, and a power source; and a folded antenna coupled to the radio circuitry and extending longitudinally along one of the bottom and the top and along the opposing sides between the first and second ends, the folded antenna encompassing at least some of the circuitry and forming an elongated gap between the opposing sides, the elongated gap facing the other of the bottom and the top.

Item 2 is the hearing device of item 1, wherein:

the folded antenna extends longitudinally along the bottom and the opposing sides between the first and second ends; and the elongated gap faces the top.

Item 3 is hearing device of item 1, wherein:

the folded antenna extends longitudinally along the top and the opposing sides between the first and second ends; and the elongated gap faces the bottom.

Item 4 is the hearing device of item 1, wherein the folded antenna is configured to conform to surfaces of the opposing sides and one of the bottom and the top.

Item 5 is the hearing device of item 1, wherein the folded antenna is disposed within the shell.

Item 6 is the hearing device of item 1, wherein the folded antenna is disposed on an exterior surface of the shell.

Item 7 is the hearing device of item 1, wherein the folded antenna comprises a coating of a dielectric or protective material.

Item 8 is the hearing device of item 1, wherein the folded antenna extends over at least about 50% of the opposing sides.

Item 9 is the hearing device of item 1, wherein the folded antenna extends over at less than about 50% of the opposing sides.

Item 10 is the hearing device of item 1, wherein the folded antenna is a continuous unitary structure or comprises a plurality of connected, discrete antenna portions.

Item 11 is the hearing device of item 1, wherein the folded antenna is one of a stamped metal structure, a metal plated structure, a conductive layer on a flexible printed circuit board, and a laser direct structuring (LDS) structure.

Item 12 is the hearing device of item 1, wherein an electric field generated by the folded antenna has an electric field polarization substantially normal to the wearer at the location of the ear.

Item 13 is the hearing device of item 1, wherein the folded antenna is configured to generate an electric field that propagates parallel to the wearer's head with a perpendicular electric field polarization that generates creeping waves.

Item 14 is the hearing device of item 1, wherein the folded antenna has a radiation efficiency in free space that is about the same as a radiation efficiency when the hearing device is worn by the wearer.

Item 15 is the hearing device of item 1, wherein the circuitry encompassed by the folded antenna improves impedance matching of the folded antenna relative to the folded antenna in an absence of the encompassed circuitry.

Item 16 is the system comprising a left hearing device according to item 1 and a right hearing device according to item 1, wherein a total radiated power of the left hearing device is substantially symmetric with a total radiated power of the right hearing device.

Item 17 is a hearing device adapted to be worn by a wearer, comprising:

a shell configured for placement on an exterior surface of an ear of the wearer, the shell comprising a first end, a second end, a bottom, a top, and opposing sides, wherein the bottom, top, and opposing sides extend between the first and second ends;

circuitry provided within the shell comprising at least a microphone, signal processing circuitry, radio circuitry, and a power source; and a folded antenna coupled to the radio circuitry and extending longitudinally along one of the bottom and the top and along the opposing sides between the first and second ends, the folded antenna encompassing at least some of the circuitry and forming an elongated gap between the opposing sides, the elongated gap facing the other of the bottom and the top, wherein the folded antenna is a double-layer structure comprising a first layer continuous with or connected to a second layer;

the first layer is disposed on exterior surfaces of shell; and the second layer is disposed on interior surfaces of the shell.

Item 18 is the hearing device of item 17, wherein:

the folded antenna extends longitudinally along the bottom and the opposing sides between the first and second ends; and the elongated gap faces the top.

Item 19 is the hearing device of item 17, wherein:

the folded antenna extends longitudinally along the top and the opposing sides between the first and second ends; and the elongated gap faces the bottom.

Item 20 is the hearing device of item 17, wherein the folded antenna is configured to conform to surfaces of the opposing sides and one of the bottom and the top.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A hearing device adapted to be worn by a wearer, comprising:

a shell configured for placement at, on or about an ear of the wearer, the shell comprising opposing sides and having an axial length defined along a longitudinal axis of the hearing device;

circuitry disposed within the shell and comprising at least signal processing circuitry, radio circuitry, and an acoustic transducer component; and a folded antenna encompassing at least some of the circuitry, the folded antenna coupled to the radio circuitry via first and second feeds and comprising:

opposing first and second sides extending along the opposing sides of the shell, the first and second feeds respectively attached to the opposing first and second sides; and a belly element that is electrically conductive and that is connected to and extends between the opposing first and second sides, the belly element having an axial length along the longitudinal axis that is shorter than an axial length of the opposing first and second sides along the longitudinal axis, the belly element being curved relative to the longitudinal axis;

wherein an elongated gap is formed between the first and second sides and opposite the belly element and extends along the longitudinal axis between the opposing first and second sides such that the opposing first and second sides are electrically connected within the folded antenna exclusively via the belly element.

2. The hearing device of claim 1, wherein the belly element is further curved along the longitudinal axis.

3. The hearing device of claim 1, wherein the belly element is curved along the longitudinal axis such that the belly element conforms to a curvature of an inner bottom surface of the shell.

4. The hearing device of claim 1, wherein the belly element is a truncated antenna portion relative to the opposing first and second sides of the folded antenna.

5. The hearing device of claim 1, wherein the opposing first and second sides of the folded antenna extend along at least 50% of the axial length of the shell.

6. The hearing device of claim 1, wherein the opposing first and second sides of the folded antenna extend along between 60% and 80% of the axial length of the shell.

7. The hearing device of claim 1, wherein the opposing first and second sides of the folded antenna extend along less than 50% of the axial length of the shell.

8. The hearing device of claim 1, wherein each of the opposing first and second sides of the folded antenna defines a continuous unitary structure.

9. The hearing device of claim 1, wherein the folded antenna comprises a plurality of connected antenna portions.

10. The hearing device of claim 1, wherein each of the opposing first and second sides of the folded antenna comprises a stamped metal structure or a metal plated structure.

11. The hearing device of claim 1, wherein each of the opposing first and second sides of the folded antenna comprises a conductive layer on a flexible printed circuit board or a laser direct structuring (LDS) structure.

12. The hearing device of claim 1, wherein the folded antenna is configured to launch creeping waves that can propagate along a surface of a head of the wearer when the hearing device is positioned at the ear of the wearer.

13. The hearing device of claim 1, wherein, when the hearing device is positioned at the ear of the wearer, the folded antenna is configured to:

generate an electric field having a direction of propagation substantially parallel to a head of the wearer; and generate an electric field polarization substantially normal to the head of the wearer.

* * * * *